(12) United States Patent
Steppan et al.

(10) Patent No.: US 10,227,779 B2
(45) Date of Patent: Mar. 12, 2019

(54) METHODS FOR MAKING PRE-FABRICATED INSULATED WALL STRUCTURES AND APPARATUS FOR USE IN SUCH METHODS

(71) Applicant: Covestro LLC, Pittsburgh, PA (US)

(72) Inventors: David D. Steppan, Gibsonia, PA (US); David M. Baily, Upper Saint Clair, PA (US); Michael F. Palmosina, II, Baden, PA (US)

(73) Assignee: COVESTRO LLC, Pittsburgh, PA (US)

( * ) Notice: Subject to any disclaimer, the term of this patent is extended or adjusted under 35 U.S.C. 154(b) by 176 days.

(21) Appl. No.: 15/286,675

(22) Filed: Oct. 6, 2016

(65) Prior Publication Data

US 2018/0100306 A1 Apr. 12, 2018

(51) Int. Cl.
*E04C 2/284* (2006.01)
*B05D 1/02* (2006.01)
(Continued)

(52) U.S. Cl.
CPC .......... *E04C 2/284* (2013.01); *B05B 13/0285* (2013.01); *B05D 1/02* (2013.01);
(Continued)

(58) Field of Classification Search
CPC ....... B65G 49/062; E04C 2/296; E04C 2/292; E04C 2/284; E04C 2/205; B23D 47/042
See application file for complete search history.

(56) References Cited

U.S. PATENT DOCUMENTS 3,560,285 A * 2/1971 Schroter ............. B29C 44/1228
156/77
3,785,913 A * 1/1974 Hallamore ............. E04C 2/284
428/71
(Continued)

FOREIGN PATENT DOCUMENTS

CA 2584852 A1 10/2008
CH 573 877 A5 3/1976
(Continued)

OTHER PUBLICATIONS https:/www.youtube.com/watch?v=UO_ATP5z0Qs; 37. Landmark Homes builds super energy efficient homes—no extra charge; Green Energy Futures; Published Apr. 21, 2013.
(Continued)

*Primary Examiner* — Jacob J Cigna
(74) *Attorney, Agent, or Firm* — Donald R. Palladino

(57) ABSTRACT

Methods of manufacturing pre-fabricated insulated wall structures are described in this specification. The methods include (a) attaching a foam panel to a front frame surface of a substantially horizontally positioned frame; (b) placing the frame having the foam panel attached thereto on a track conveyor configured to convey the frame having the foam panel attached thereto in a substantially upright position; (c) conveying the frame having the foam panel attached thereto on the track conveyer in a substantially upright position to a spray foam application station; and (d) spray applying a spray foam composition into a cavity of the frame to form a substantially upright positioned wall structure having a foam layer deposited in the cavity in which the foam layer adheres to the foam panel. Also disclosed are track conveyors suitable for use in such methods.

25 Claims, 21 Drawing Sheets

(51) Int. Cl.
| | | |
|---|---|---|
| *B65G 13/00* | (2006.01) | |
| *B65G 13/11* | (2006.01) | |
| *E04B 2/00* | (2006.01) | |
| *E04C 2/20* | (2006.01) | |
| *B05B 13/02* | (2006.01) | |
| *E04C 2/52* | (2006.01) | |
| *E04B 1/76* | (2006.01) | |
| *B29K 625/00* | (2006.01) | |
| *B29K 75/00* | (2006.01) | |
| *B29C 44/12* | (2006.01) | |
| *B29C 44/18* | (2006.01) | |
| *B29L 31/00* | (2006.01) | |
| *B29K 675/00* | (2006.01) | |
| *B05B 12/24* | (2018.01) | |

(52) U.S. Cl.
CPC .............. *B65G 13/00* (2013.01); *B65G 13/11* (2013.01); *E04C 2/205* (2013.01); *E04C 2/46* (2013.01); *B05B 12/24* (2018.02); *B29C 44/1285* (2013.01); *B29C 44/186* (2013.01); *B29C 44/188* (2013.01); *B29K 2075/00* (2013.01); *B29K 2625/06* (2013.01); *B29K 2675/00* (2013.01); *B29L 2031/776* (2013.01); *E04B 1/7654* (2013.01); *E04C 2/521* (2013.01)

(56) References Cited

U.S. PATENT DOCUMENTS

| | | |
|---|---|---|
| 4,114,333 A | 9/1978 | Jones et al. |
| 4,114,345 A | 9/1978 | Nilsen |
| 4,288,962 A | 9/1981 | Kavanaugh |
| 4,409,768 A * | 10/1983 | Boden ............. E04C 2/384 52/309.4 |
| 4,443,988 A | 4/1984 | Coutu, Sr. |
| 4,471,591 A | 9/1984 | Jamison |
| 4,635,423 A | 1/1987 | Ward |
| 4,641,468 A | 2/1987 | Slater |
| 4,671,038 A | 6/1987 | Porter |
| 4,765,105 A | 8/1988 | Tissington et al. |
| 4,802,399 A * | 2/1989 | Olson ............. B23D 47/02 384/55 |
| 4,856,244 A | 8/1989 | Clapp |
| 4,955,800 A | 9/1990 | Rothwell et al. |
| 5,353,560 A | 10/1994 | Heydon |
| 5,417,023 A | 5/1995 | Mandish |
| 5,765,330 A | 6/1998 | Richard |
| 5,950,386 A | 9/1999 | Shipman et al. |
| 5,950,389 A | 9/1999 | Porter |
| 5,953,883 A | 9/1999 | Ojala |
| 5,979,131 A | 11/1999 | Remmele et al. |
| 6,036,123 A | 3/2000 | West |
| 6,085,479 A | 7/2000 | Carver |
| 6,205,729 B1 | 3/2001 | Porter |
| 6,308,491 B1 | 10/2001 | Porter |
| 6,332,304 B1 | 12/2001 | Fuhrman |
| 6,408,594 B1 | 6/2002 | Porter |
| 6,438,915 B1 | 8/2002 | Beauboeuf |
| 6,481,172 B1 | 11/2002 | Porter |
| 6,854,218 B2 | 2/2005 | Weiss |
| 7,127,856 B2 * | 10/2006 | Hagen, Jr. ............. E04B 1/7604 52/309.9 |
| 7,127,858 B2 | 10/2006 | Layfield |
| 7,168,216 B2 | 1/2007 | Hagen, Jr. |
| 7,621,101 B2 * | 11/2009 | Solomon ............. E04C 2/384 52/404.1 |
| 8,033,065 B2 | 10/2011 | Paetkau et al. |
| 8,065,846 B2 | 11/2011 | McDonald et al. |
| 8,397,465 B2 | 3/2013 | Hansbro et al. |
| 8,458,983 B2 | 6/2013 | Propst |
| 8,613,180 B2 * | 12/2013 | Strickland ............. E06B 3/822 49/501 |
| 8,635,778 B1 | 1/2014 | Hagaman |
| 8,844,243 B1 | 9/2014 | Gillman |
| 8,925,270 B2 | 1/2015 | Grisolia et al. |
| 8,959,862 B1 | 2/2015 | Kreizinger |
| 9,010,054 B2 * | 4/2015 | Herdt ................ B29C 44/1214 52/220.2 |
| 2002/0088199 A1 * | 7/2002 | Linn ........................ E04C 2/26 52/745.19 |
| 2003/0029108 A1 | 2/2003 | Neuhaus, III et al. |
| 2004/0016194 A1 | 1/2004 | Stefanutti et al. |
| 2005/0186062 A1 | 8/2005 | Wall |
| 2007/0033890 A1 * | 2/2007 | Solomon ................ E04C 2/296 52/309.7 |
| 2007/0261340 A1 | 11/2007 | Cecilio et al. |
| 2008/0276553 A1 | 11/2008 | Ingjaldsottir et al. |
| 2008/0313985 A1 | 12/2008 | Duncan |
| 2009/0044479 A1 | 2/2009 | Martens et al. |
| 2010/0011701 A1 | 1/2010 | Cole et al. |
| 2010/0043327 A1 | 2/2010 | Rothwell |
| 2012/0011792 A1 | 1/2012 | Dewildt et al. |
| 2012/0096785 A1 | 4/2012 | Weeks |
| 2012/0174511 A1 | 7/2012 | Harding |
| 2012/0240501 A1 | 9/2012 | Spiegel |
| 2012/0297700 A1 | 11/2012 | Quinn |
| 2012/0317923 A1 * | 12/2012 | Herdt .................. B29C 44/1214 52/783.11 |
| 2013/0037984 A1 * | 2/2013 | Arnauts ............. B29C 44/1228 264/46.6 |
| 2013/0067838 A1 | 3/2013 | Black et al. |
| 2013/0104480 A1 | 5/2013 | Smith |
| 2013/0269272 A1 | 10/2013 | Turner |
| 2013/0305643 A1 * | 11/2013 | Singleton ................ E04C 2/284 52/309.8 |
| 2013/0312350 A1 | 11/2013 | Kreizinger |
| 2014/0115991 A1 | 5/2014 | Sievers et al. |
| 2014/0265027 A1 | 9/2014 | Kreizinger |
| 2015/0093535 A1 | 4/2015 | Lambach et al. |
| 2015/0376898 A1 * | 12/2015 | Kreizinger ................ E04C 2/24 52/483.1 |
| 2016/0244963 A1 * | 8/2016 | Bemis ................ E04B 1/7604 |

FOREIGN PATENT DOCUMENTS

| | | |
|---|---|---|
| DE | 2240526 | 2/1974 |
| FR | 217205879 | 10/1973 |
| FR | 2391346 | 12/1978 |
| GB | 1397559 | 9/1971 |

OTHER PUBLICATIONS

Grisolia, Anthony et al; U.S. Appl. No. 14/816,589; Title: Wall Structure Penetration Attachment; Assigned to: Covestro LLC; filed Aug. 3, 2015.

Grisolia, Anthony et al; U.S. Appl. No. 14/816,668; Title: Stucco Wall Structure; Assigned to: Covestro LLC; filed Aug. 3, 2015.

* cited by examiner

METHODS FOR MAKING PRE-FABRICATED INSULATED WALL STRUCTURES AND APPARATUS FOR USE IN SUCH METHODS

FIELD

This specification relates to methods for making pre-fabricated insulated wall structures and track conveyers configured to convey a frame of a wall structure that is suitable for use in such methods. The specification also relates to pre-fabricated insulated wall structures made using such methods and conveyors.

BACKGROUND

Insulated wall panels provide thermal insulation for homes and buildings. A wall panel's R-value reflects its ability to impede heat flow. The greater the ability to impede heat flow, the higher the R-value. Over the years, insulation standards have become stricter, requiring higher R-values and continuous insulation on the exterior side of insulated wall panels. The current market solutions to these stricter requirements are typically (1) pre-fabricated wall panels that incorporate insulation at the construction site, and (2) Structural Insulated Panels (SIPs).

The pre-fabricated wall panel that incorporates insulation at the construction site has been the more widely adopted solution. However, pre-fabricated walls that incorporate insulation at the construction site require a separate sub-contractor for on-site installation with fiberglass batting, which is known to have suboptimal R-values. Fiberglass is not an air barrier and allows for air intrusion, thus increasing the probability of condensation and mold growth within wall systems. Furthermore, additional material is necessary to finish the wall (e.g., Oriented Strand Panels (OSBs) and house wrap) and the overall construction process duration is extended, thereby increasing the risk of trade scheduling conflicts. Installing insulation onsite also leads to potential inconsistencies in insulation installation, performance, and usage.

The second solution, SIPs, also have several drawbacks. SIPs typically utilize expanded polystyrene (EPS) foam insulation sandwiched between two OSB panels, which only provide thermal performance of about R-4 per inch. Additionally, current SIPs are mainly used by smaller scale home builders with high levels of home customization.

More recently, pre-fabricated insulated wall structures satisfying the strict industry insulation requirements that can be made without excessive material and labor costs have been proposed. Such foam wall structures can include a polyiso panel attached to at least a portion of a front frame surface, such that the polyiso panel and frame members define one or more voids within the frame; and a foam layer received within at least a portion of one of the voids within the frame, wherein the foam layer adheres to at least a portion of the polyiso panel.

Because of the many benefits that can be provided by such pre-fabricated insulated wall structures, it would be desirable to provide efficient, commercially viable production processes and equipment for their manufacture that, among other things, is compact and lends itself to practical retrofitting of existing pre-fabricated wall manufacturing facilities.

The present invention has been made in view of the foregoing desire.

SUMMARY

In certain respects, the specification relates to methods of manufacturing pre-fabricated insulated wall structures. The methods comprise: (a) placing a frame having a foam panel attached thereto on a track conveyor configured to convey the frame having the foam panel attached thereto in a substantially upright position, wherein (i) the frame comprises a first member, a second member spaced apart from the first member; and connecting members extending between the first member and the second member, (ii) the first member, the second member, and the connecting members each comprise a front surface and a rear surface that form the front frame surface and a rear frame surface, and (iii) the foam panel, the first member, the second member, and the connecting members define a cavity within the frame; (b) conveying the frame having the foam panel attached thereto on the track conveyer in a substantially upright position to a spray foam application station; and (c) spray applying a spray foam composition into the cavity of the substantially upright positioned frame having the foam panel attached thereto in the spray foam application station to form a substantially upright positioned pre-fabricated insulated wall structure having a foam layer deposited in the cavity in which the foam layer adheres to the foam panel.

In other respects, the specification relates to methods of manufacturing pre-fabricated insulated wall structures. The methods comprise: (a) attaching a foam panel to a front frame surface of a substantially horizontally positioned frame, wherein (i) the frame comprises a first member, a second member spaced apart from the first member; and connecting members extending between the first member and the second member, (ii) the first member, the second member, and the connecting members each comprise a front surface and a rear surface that form the front frame surface and a rear frame surface, and (iii) the foam panel, the first members, the second member, and the connecting members define a cavity within the frame; (b) placing the frame having the foam panel attached thereto on a track conveyor configured to convey the frame having the foam panel attached thereto in a substantially upright position; (c) conveying the frame having the foam panel attached thereto on the track conveyer in a substantially upright position to a spray foam application station; and (d) spray applying a spray foam composition into the cavity of the substantially upright positioned frame having the foam panel attached thereto in the spray foam application station to form a substantially upright positioned pre-fabricated insulated wall structure having a foam layer deposited in the cavity in which the foam layer adheres to the foam panel.

In still other respects, the specification relates to track conveyors configured to convey a frame of a wall structure in a substantially upright position. The wheeled track conveyers comprise: (a) a plurality of spaced apart racks; (b) an upper substantially horizontally positioned track mounted on the racks and extending therebetween and comprising rotating members disposed along the track; (c) a lower substantially horizontally positioned track mounted on the racks and extending therebetween and comprising rotating members disposed along the track; and (d) a substantially vertically positioned track mounted on the racks and extending therebetween and comprising rotating members disposed along the track, wherein the substantially vertically positioned track is disposed beneath the lower substantially horizontally positioned track.

The specification also relates to, among other things, wall structures made by such processes and wall structures made using such track conveyors.

BRIEF DESCRIPTION OF THE DRAWINGS

Various features and characteristics of the inventions described in this specification may be better understood by reference to the accompanying figures, in which.

The reader will appreciate the foregoing features and characteristics, as well as others, upon considering the following detailed description of the inventions according to this specification.

DETAILED DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

As indicated, some embodiments of the invention relate to methods of manufacturing pre-fabricated insulated wall structures. As used herein, "pre-fabricated" means that the insulated wall structure is manufactured at a facility remote from a building construction site. As used herein, "insulated wall structure" means that the wall structure includes a foam layer deposited in a cavity formed by a foam panel and frame members, as described more fully below.

Figure 1:
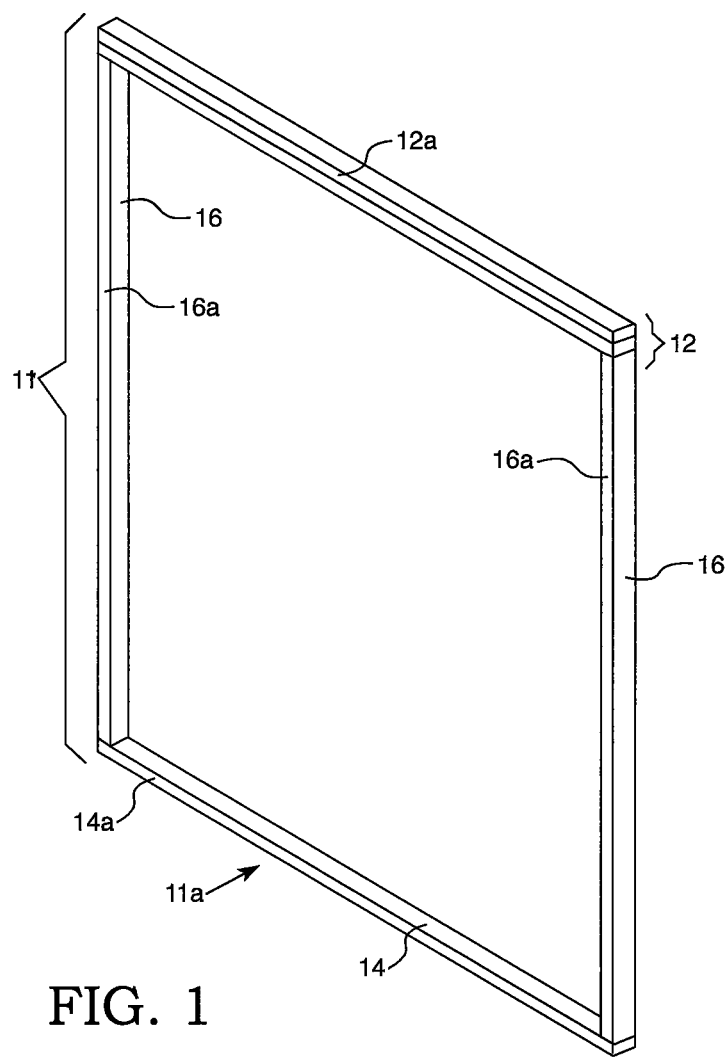
FIG. 1 is a front perspective view of a wall structure frame.
Figure 2:
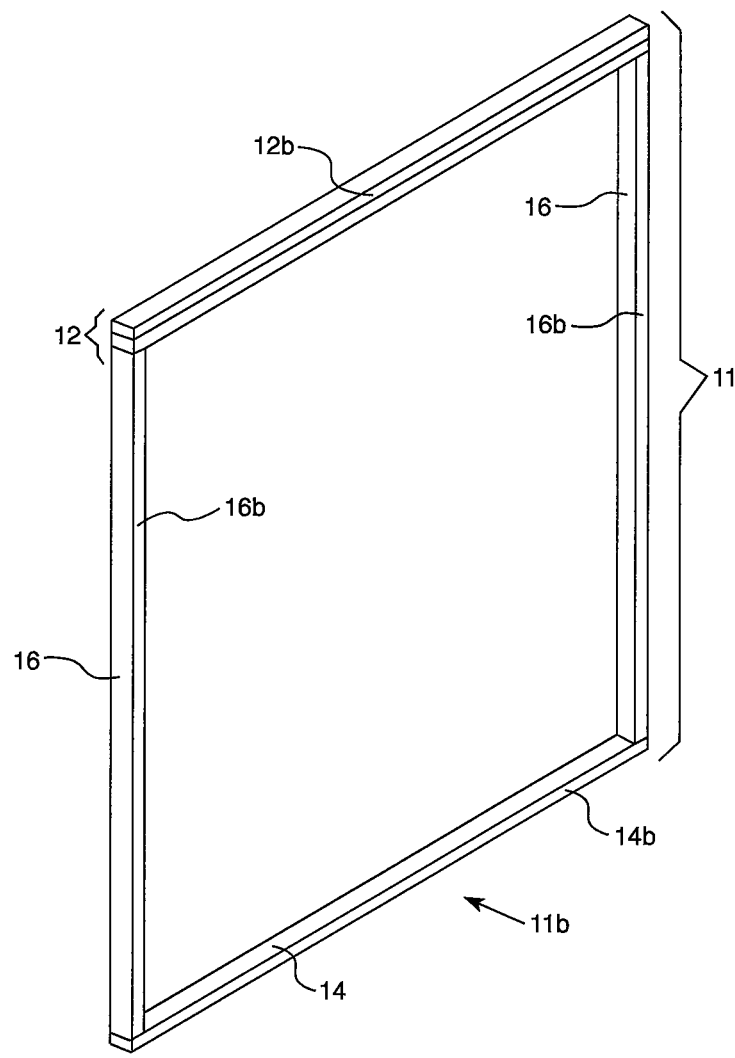
FIG. 2 is a rear perspective view of the wall structure frame shown in FIG. 1.

Pre-fabricated insulated wall structures that can be produced by the methods of the present specification will now be described with reference to the Figures. Referring, for example, to FIGS. 1-4, a pre-fabricated insulated wall structure 10 includes a frame 11, a foam panel 70, and a foam layer 30. As shown in FIGS. 1 and 2, the frame 11 may be defined by a first member 12, a second member 14 spaced apart from the first member 12, and connecting members 16 extending between the first member 12 and the second member 14. The first member 12, the second member 14, and the connecting members 16 each have a front surface 12a, 14a, 16a and a rear surface 12b, 14b, 16b that define a front frame surface 11a and a rear frame surface 11b, respectively. As used herein, the term "connecting member" refers to a member that connects first member 12 with second member 14 and includes side members 16 and primary support members 17.

The frame 11 can be constructed into different shapes depending on its intended use. For example, as shown in FIGS. 1 and 2, the frame 11 can be constructed as a conventional industry standard rectangular or square frame 11. The first member 12 and the second member 14 may be spaced apart and extend parallel to each other, and the connecting members 16 may extend perpendicular to the first member 12 and the second member 14 so as to from a rectangular or square frame 11. The shape and design of the frame 11 is not so limited and can be constructed into any desired shape. Generally, the shape and design of the frame 11 is constructed in accordance with the floor plans designed for a particular home or building.

Figure 3:
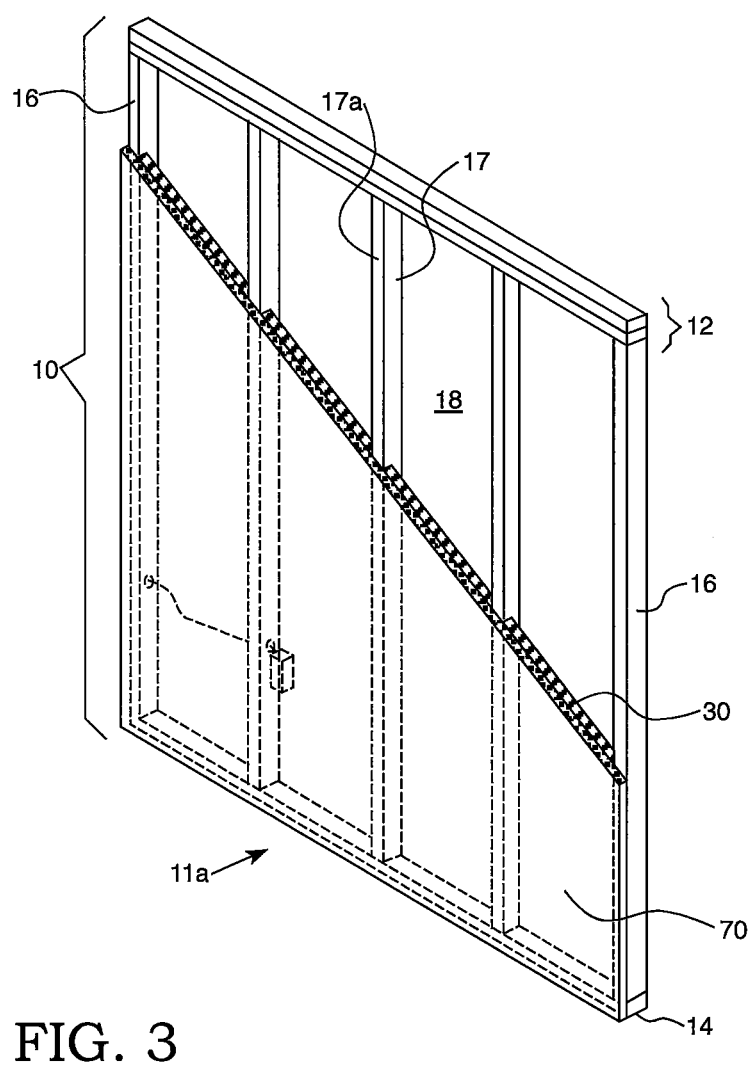
FIG. 3 is a front perspective view of a wall structure comprising a foam panel and a foam layer shown in partial cut-away.
Figure 4:
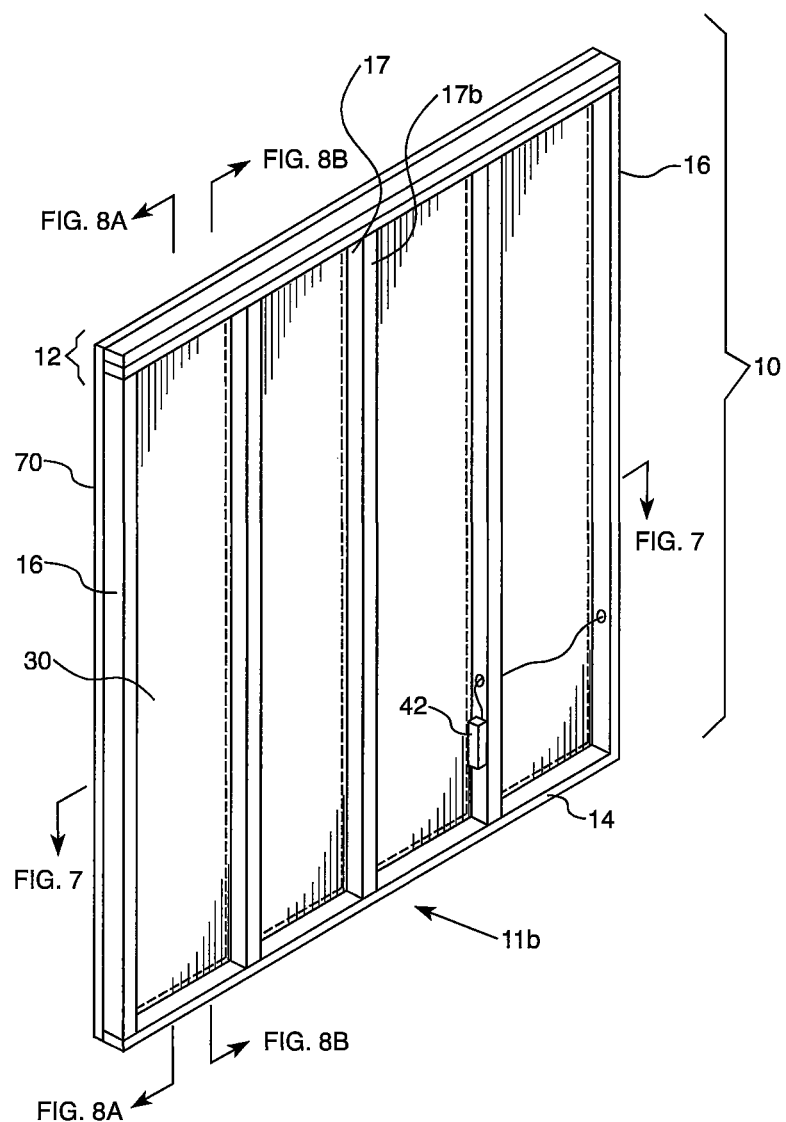
FIG. 4 is rear perspective view of the wall structure shown in FIG. 3.

Referring to FIGS. 3 and 4, at least one other connecting member (i.e., a member connecting the first member 12 to the second member 14), such as primary support member 17, may be positioned between the connecting members 16. The primary support members 17 may extend between the first member 12 and the second member 14. The primary support members 17 may define a front primary support surface 17a and a rear primary support surface 17b. As shown in FIGS. 3 and 4, the front primary support surface 17a and the rear primary support surface 17b correspond to the front frame surface 11a and the rear frame surface 11b of the frame 11. The primary support members 17 may be spaced apart. Cavities 18 may be defined by the space formed within the frame 11 between the primary support members 17, the connecting members 16, the first member 12, and/or the second member 14. The size of each cavity 18 can vary based on the size of the frame 11, the distance between consecutively positioned primary support members 17, and the number of primary support members 17 present, if any. The primary support members 17, the connecting members 16, the first member 12, and/or the second member 14 may comprise one or more plates, panels, beams, studs, or the like. For example, as shown in FIGS. 1-4, the first member 12 may include two beams, although it will be appreciated that more than two beams could be used, if desired.

The connecting members 16 and/or the primary support members 17 may be fixedly engaged to the first member 12 and the second member 14. For example, the connecting members 16 and/or the primary support members 17 may be fixedly engaged to the first member 12 and the second member 14 with fasteners. Suitable fasteners include, but are not limited to, nails, nail plates, staples, bolts, screws, and rivets. The first member 12, the second member 14, the connecting members 16, and the primary support members 17 can be made of various materials, such as wood, metal, fiberglass, plastic, wood-polymer composite materials, or a combination of any thereof. The first member 12, the second member 14, the connecting members 16, and the primary support members 17 can be made of the same material or different materials.

The dimensions of the first member 12, the second member 14, the connecting members 16, and the primary support members 17 can vary depending on the intended use of the frame 11. The first member 12, the second member 14, the connecting members 16, and the primary support members 17 can each have any dimension. The first member 12, the second member 14, the connecting members 16, and the primary support members 17 can have the same dimensions. For example, the first member 12, the second member 14, the connecting members 16, and the primary support members 17 may have the same thickness and width dimensions, and the same or different length dimensions. For example, the first member 12, the second member 14, the connecting members 16, and the primary support members 17 can all have a thickness and width and height dimension of nominally 2×4 inches. In another example, the first member 12, the second member 14, the connecting members 16, and the primary support members 17 can all have thickness and width dimensions of nominally 2×6 inches.

The first member 12, the second member 14, and the connecting members 16 can have the same dimensions, which may be different than the dimensions of the primary support members 17. For example, the first member 12, the second member 14, and the connecting members 16 may have the same thickness and width dimensions, and the primary support members 17 may have thickness and/or width dimensions that may be different than the dimensions of the first member 12, the second member 14, and the connecting members 16. For example, the first member 12, the second member 14, and the connecting members 16 can have thickness and width dimensions of nominally 2×6 inches, and the primary support members 17 can have thickness and width dimension of nominally 2×4 inches.

Figure 5:
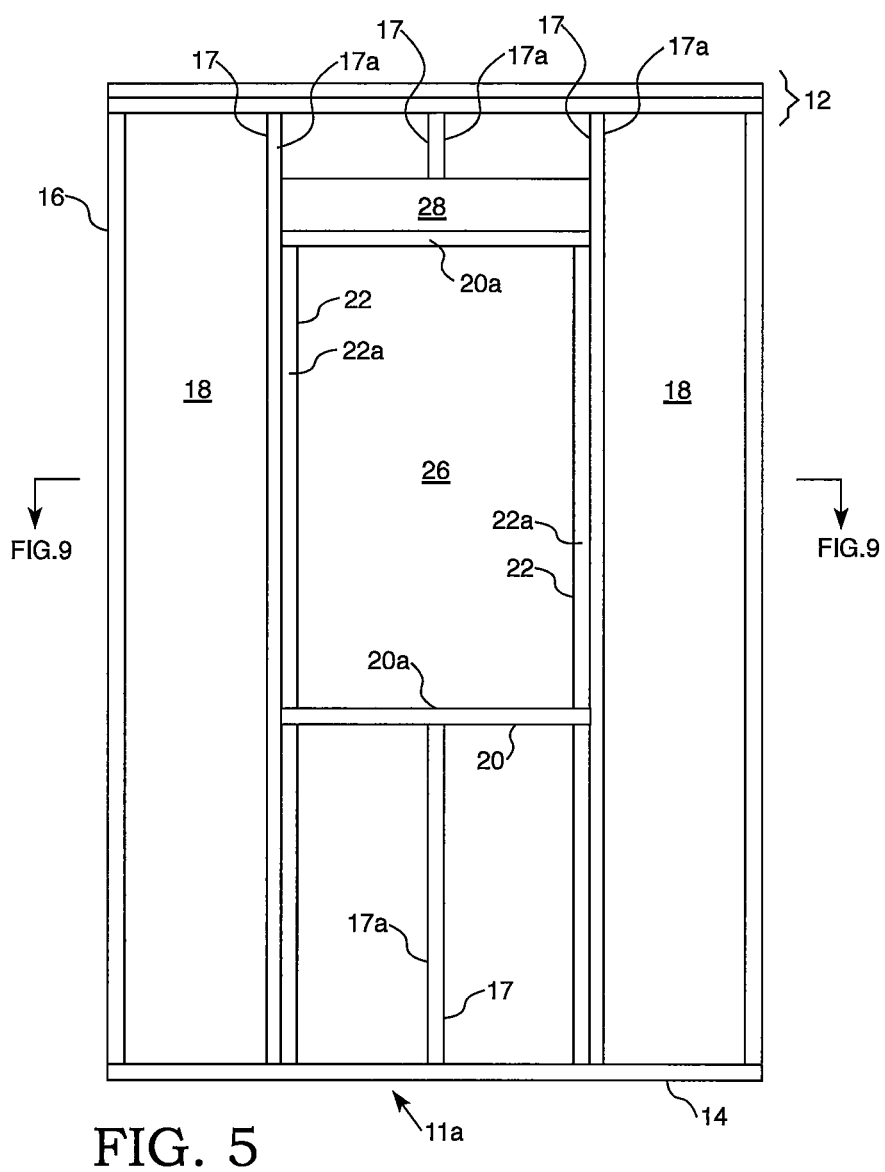
FIG. 5 is a front view of a wall structure frame with a window opening.
Figure 6:
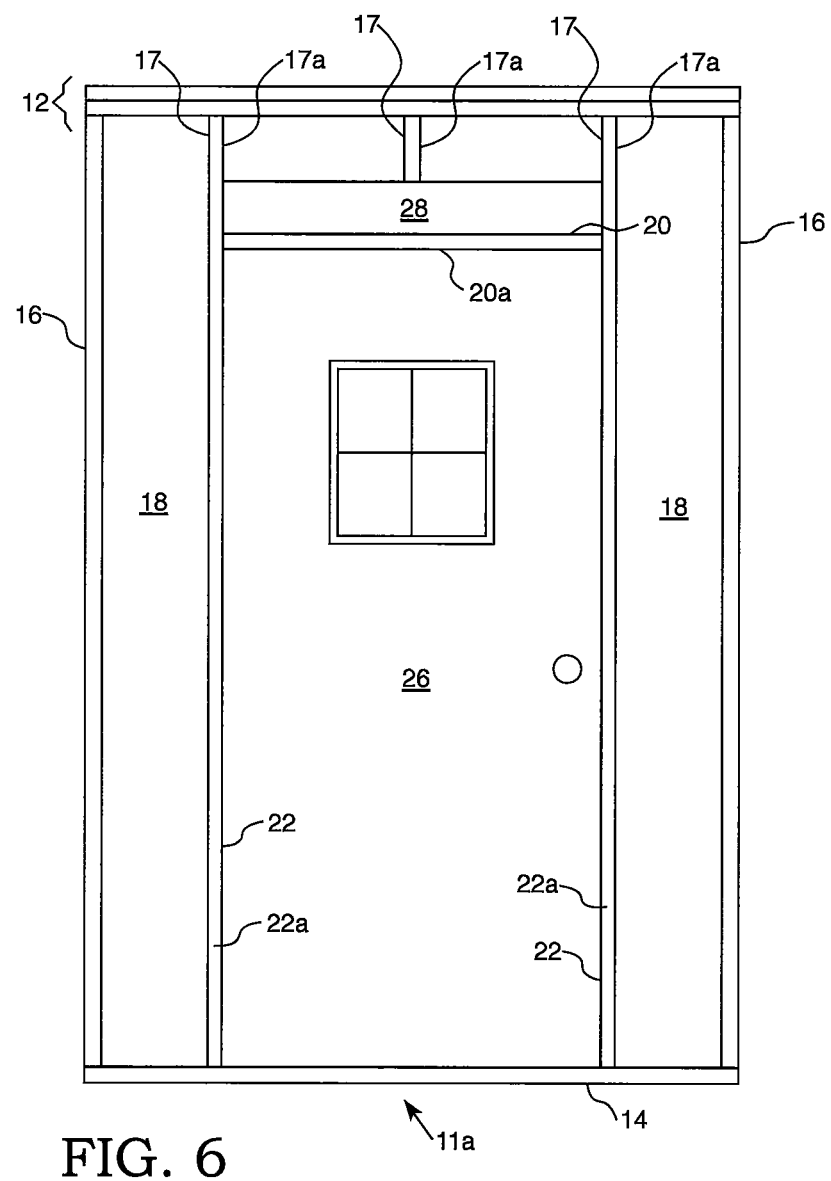
FIG. 6 is a front view of a wall structure frame with a door.

Referring to FIGS. 5 and 6, a wall structure can comprise one or more secondary support members 20, and/or tertiary support members 22. The secondary support members 20 and the tertiary support members 22 may comprise one or more plates, panels, beams, studs, or the like. The secondary support members 20 and the tertiary support members 22 can be incorporated into the frame 11 to provide additional structural support, for example, to form spaces for windows, doors, and the like. The secondary support members 20 and the tertiary support members 22 can have dimensions that are the same as or different than the primary support members 17, the connecting members 16, the first member 12, and/or the second member 14. For example, the secondary support member 20 and the tertiary support members 22 can have shorter lengths than the primary support members 17, the connecting members 16, the first member 12, and/or the second member 14.

As shown in FIGS. 5 and 6, the secondary support members 20 may have a front secondary support surface 20a and a rear secondary support surface (not shown in FIGS. 5 and 6) that correspond with the front and rear frame surfaces 11a and 11b, and the front and rear primary support surfaces 17a and 17b. Similarly, the tertiary support members 22 may have a front tertiary support surface 22a and a rear tertiary support surface 22b (see FIG. 9) that correspond with the front and rear frame surfaces 11a and 11b and the front and rear primary support surfaces 17a and 17b.

The secondary support members 20 extend between and attach to the primary support members 17, or alternatively, the secondary support members 20 extend between and attach to a primary support member 17 and a connecting member 16. The tertiary support members 22 extend between two secondary support members 20 or between a secondary support member 22 and the first member 12 and/or the second member 14.

The secondary support members 20, the tertiary support members 22, the primary support members 17, the connecting members 16, the first member 12, and/or the second member 14 form a secondary cavity 26. As shown in FIGS. 5 and 6, the secondary cavity 26 can be used as a space for a window, a door, or any other opening. For example, the secondary support members 20, the tertiary support members 22, the primary support members 17, the connecting members 16, the first member 12, and the second member 14 can be constructed as a conventional industry standard rectangular or square wall panel having a window, door, or any other opening. For example, referring to FIG. 5, a rectangular or square wall structure having a window can be formed as follows: a first member 12 and a second member 14 may be spaced apart and extend parallel to each other; connecting members 16 may extend between the first member 12 and the second member 14 in a direction perpendicular to the first member 12 and the second member 14; primary support members 17 may be positioned between the connecting members 16 and extend between the first member 12 and the second member 14 in a direction perpendicular to the first member 12 and the second member 14; two secondary support members 20 may be spaced apart and extend between the primary support members 17 in a direction parallel to the first member 12 and the second member 14; and two tertiary support members 22 may be spaced apart and extend between the two secondary members 20 in a direction perpendicular to the secondary support members 20 and the first member 12 and the second member 14. In addition, the primary support members 17 can also extend between the secondary members 20 and the first member 12 and/or the second member 14. As shown in FIG.

5, a secondary cavity 26 may be formed between the secondary support members 20 and the tertiary support members 22. The resulting rectangular or square wall panel can be used in a residential home or building. The shape and design of the frame 11 of the wall structure 10 is not so limited and can assume any shape and design as desired.

Additional support members and structural elements may also be used depending on the intended use of the wall structure 10. For example, and as shown in FIGS. 5 and 6, a header 28 may be used to provide additional support for a door or window. Other additional support members may be used for structural purposes, design purposes, and the like.

Figure 7:
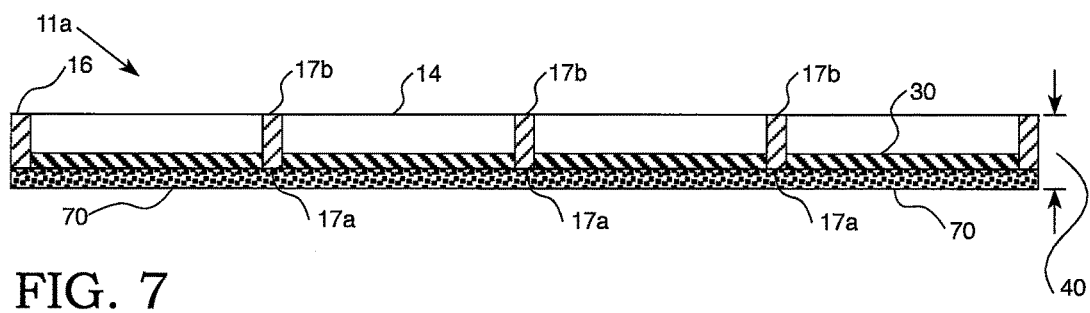
FIG. 7 is a top cross-sectional view of the wall structure shown in FIGS. 3 and 4.
Figure 8A:
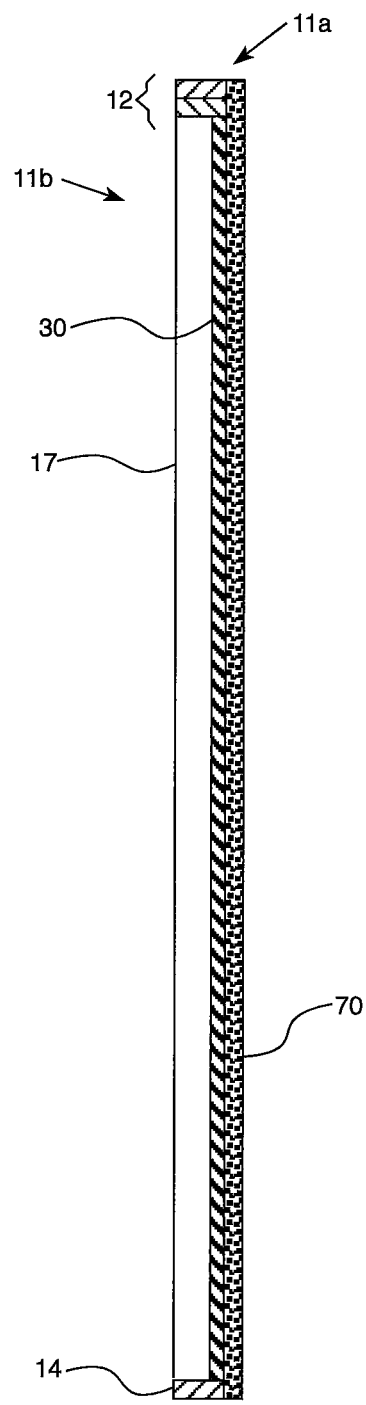
FIG. 8A is a side cross-sectional view of the wall structure shown in FIGS. 3 and 4.
Figure 8B:
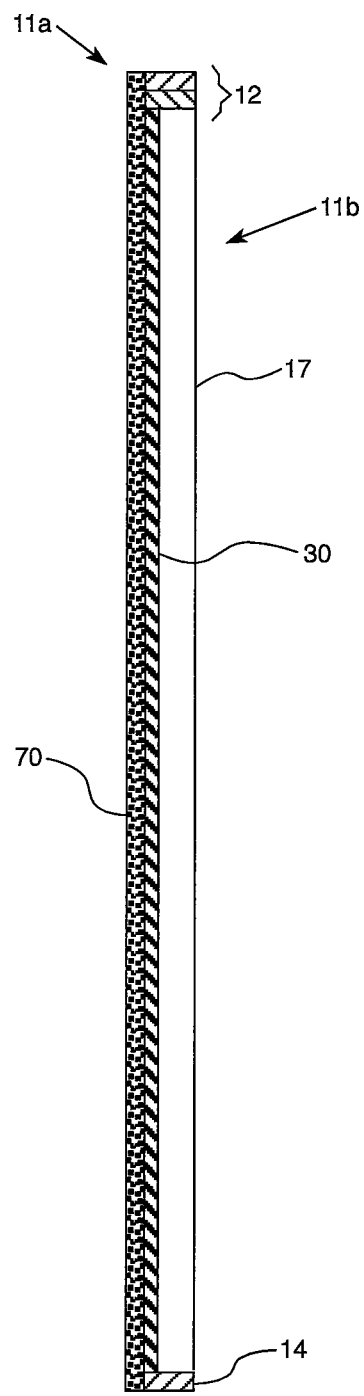
FIG. 8B is a side cross-sectional view of the wall structure shown in FIGS. 3 and 4.

Referring to FIGS. 7, 8A, and 8B, a foam panel 70 may be attached to at least a portion of the front frame surface. As used in this specification, the term "foam panel" refers to panels comprising foam, such as, for example, polyisocyanurate (sometimes referred to as "polyiso") foam panels, expanded polystyrene foam panels, and extruded polystyrene foam panels. As will be appreciated, such foam panels have relatively low fastener pull-out strength as compared to wood panels, plywood panels, and OSBs. Accordingly, "foam panel" as used in this specification, is to be distinguished from wood panels, plywood panels, and OSBs, for example. As used herein, "foam" refers to a substance that is formed by trapping pockets of gas in a liquid or solid. In certain embodiments, the foams described in this specification are "closed-cell" foams. The term "closed-cell foam", as used in this specification, means that the foam has a closed cell content of at least 80%, sometimes at least 90%, when measured according to ASTM D6226-15, which is incorporated herein by reference. In certain embodiments, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "panel", as used in this specification, refers to a solid, relatively thin and flat slab of material, which in some cases, has a rectangular or square shape. In some embodiments, the foam panels described herein have a thickness of no more than 2 inches (5.08 cm), such as a thickness of 1 to 2 inches (2.54 to 5.08 cm) or 1 to 1.5 inches (2.54 cm to 3.81 cm).

The foam panel 70 attached to the front frame surface 11a can comprise a facer material on the rear face and/or the front face of the foam. For example, the foam panel 70 may comprise a polyiso panel comprising a polyisocyanurate foam layer and a facer material attached to a front face and/or a rear face of the polyisocyanurate foam layer. It is understood that a polyiso panel or other type of foam panel can comprise a facer material attached to just one face, either the front face or the rear face, of a polyisocyanurate foam layer or other core foam layer (e.g., expanded polystyrene or extruded polystyrene).

Polyiso panels and other types of foam panels generally comprise a facer material attached to and substantially covering both sides (the front and rear faces) of a polyisocyanurate foam layer or other core layer. Facer materials can also comprise foil or foil/glass composites. Facer materials can also comprise fibrous materials such as fiberglass materials or other fiber-reinforced sheet-like materials. Examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso panel or other type of foam panel comprises facer materials on both the front and rear faces of the polyisocyanurate foam layer or other core layer, then the facer material on the front face may be the same as or may be different than the facer material on the rear face. The facer material should meet the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualify as a water-resistive barrier in accordance with International Residential Code (IRC) 703.2 (2012), which are each incorporated by reference into this specification. For embodiments in which the first foam panel comprises a polyiso panel, the foam panel may meet the requirements of ASTM C1289-15: Standard Specification for Faced Rigid Cellular Polyisocyanurate Thermal Insulation Panel, which is incorporated by reference into this specification.

Some embodiments of the methods described in this specification comprise attaching a foam panel to the front frame surface of, for example, a substantially horizontally positioned frame. As used herein, the phrase "substantially horizontal" when used with reference to the position of the frame when the foam panel is attached means that the longest dimension of each of the frame members 12, 14, 16 and 17 is positioned generally parallel to the direction of gravity. For example, in some cases "substantially horizontal" in this context means that the longest dimension of frame members 12, 14, 16 and 17 is positioned at a slope of 0° to 30° from the direction of gravity, such as 0° to 20° from the direction of gravity, or, in some cases, 0° to 10° from the direction of gravity.

Figure 10:
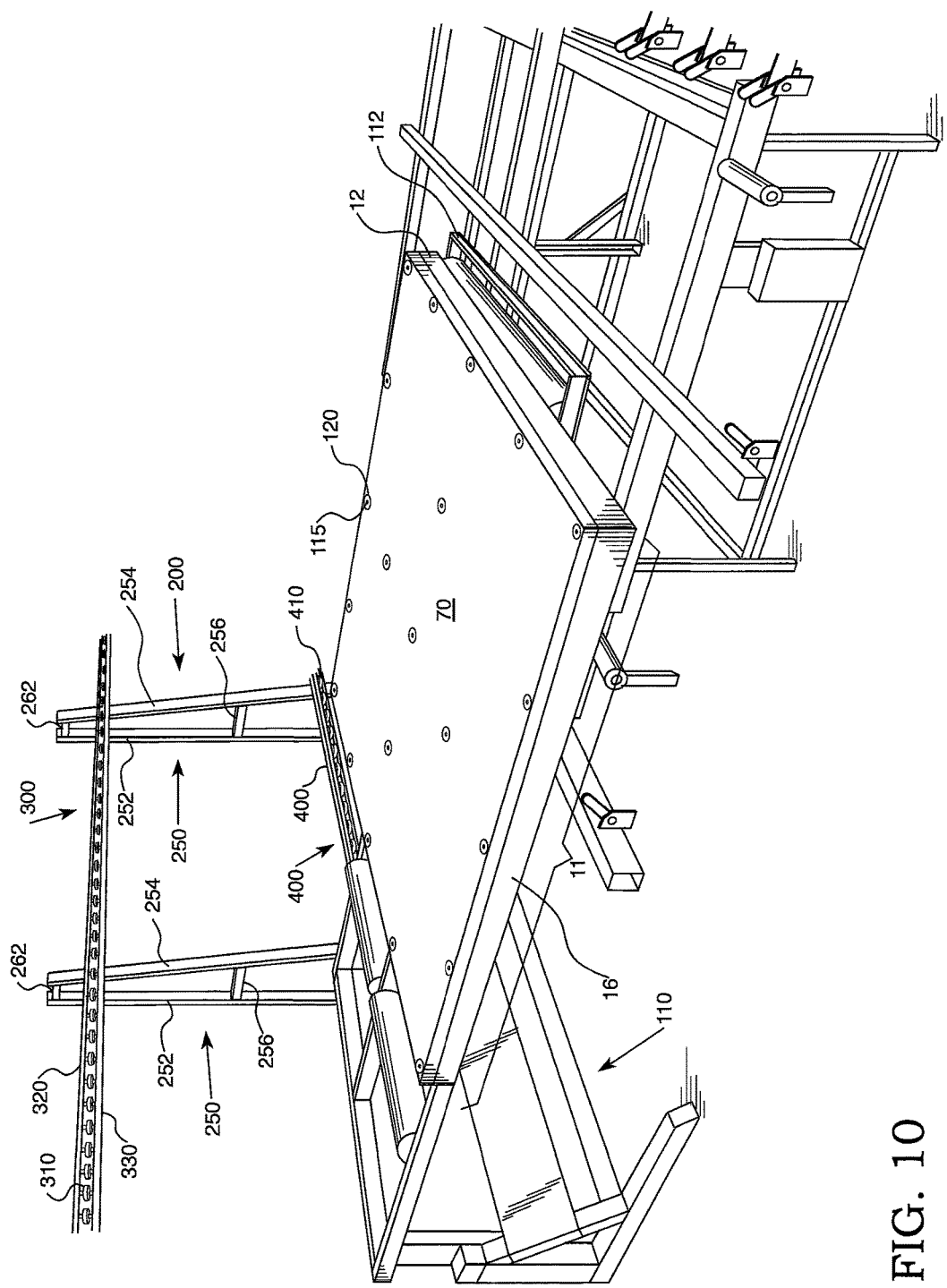
FIG. 10 is a perspective view of a substantially horizontally positioned frame having a foam panel attached thereto which is positioned on a tilting device prior to placement on a track conveyor.

Referring to FIG. 10, a foam panel 70 can be attached to the front frame surface 11a while the frame 11 is positioned on a framing table where the frame 11 may be constructed and which holds the frame members in the required position while the framing members are attached to each other, using suitable fasteners. A framing table can be highly suitable for ensuring that the frame members are attached to each other at the perpendicular and parallel positions to each other (if desired) and therefore can also ensure that the foam panel 70 when attached to the frame 11 is also installed in the same plane. This means that the surfaces 12a, 14a, 16a, 17a, 20a and 22a are in the same plane and flat and flush so that the gap between these surfaces and the foam 70 is minimized; making it easier to attach the foam panel 70 in the desired position on the frame 11.

In certain embodiments, after ensuring correct attachment of the framing members, the frame 11 is moved on to a tilting device 110. Tilting device 110 can be any device configured to receive frame 11 in a substantially horizontal position (as shown in FIG. 10) and which is capable of placing the frame 11 having the foam panel 70 attached thereto on a track conveyor configured to convey the frame 11 having the foam panel 70 attached thereto in a substantially upright position. In some embodiments, frame 11 rests on tiltable platform 112 of tilting device 110. While foam panel 70 is attached to the front frame surface 11a of the frame 11, tiltable platform 112 may be oriented substantially horizontally.

In the methods of this specification, the foam panel 70 is attached to the front frame surface 11a. The foam panel 70 can be attached to any of the front faces (12a, 14a, and/or 16a) of the constituent members (12, 14, 16, and 17) of the frame 11. For example, the foam panel 70 can be attached to the front faces 12a and 14a of the first and second members 12 and 14, to the front faces 16a, 17a of the connecting members 16, 17 extending therebetween. The foam panel 70 can be attached to the front frame surface 11a with fasteners 115 (see also FIG. 11) and/or an adhesive (not shown). Attachment fasteners can include, but are not limited to, nails, staples, screws, bolts, or rivets, or a combination of any thereof. Attachment adhesives can comprise a construction adhesive that is compatible with the adjoining materials. For example, an adhesive used to attach a foam panel to a frame can comprise a foam material (which may be the same foam material or a different foam material as the foam material comprising the foam layer, described below). Because first foam panel 70 may comprise polyisocyanurate foam or foams having relatively low fastener pull-out strength, care should be used when mechanically fastening first foam panels 70 to frames so as not to damage the foam panels.

Figure 11:
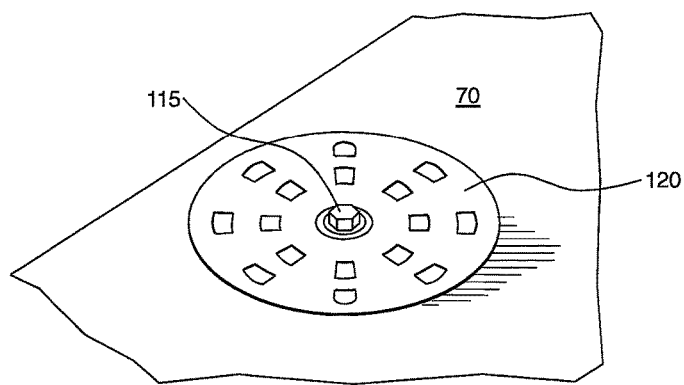
FIG. 11 is a perspective view of a collated nail equipped with a continuous rigid insulation washer attaching a foam panel to a front frame surface.

In certain embodiments of the methods of this specification, and as is depicted in FIG. 11, for example, the foam panel 70 is attached to the front frame surface 11a by using fasteners, such as SCRAIL® collated nails (commercially available from FASCO America®, Muscle Shoals, Ala.) 115 equipped with a continuous rigid insulation washer 120 (a "CI washer").

Alternatively, the foam panel 70 can be attached to the front frame surface by the use of one or more adhesives. The adhesives may be selected from latex-based adhesives, reactive hot melts, polyester adhesives, polyamide adhesives, acrylic adhesives, one-component epoxy-based adhesives, one-component polyurethane-based adhesives, two-component polyurethane-based adhesives, and combinations of any thereof. Also, as described below, a foam material may be used as the adhesive. For example, a layer of foam may be applied to the first foam panel, the front frame surface, or both, before positioning and attaching the first foam panel to the front frame surface.

The foam panel 70 attached to the frame 11 may comprise multiple separate foam panels (i.e., multiple sections) which may be joined together by tape (such as is described below) or caulk or polyurethane foam at this stage or later in the process.

Figure 12:
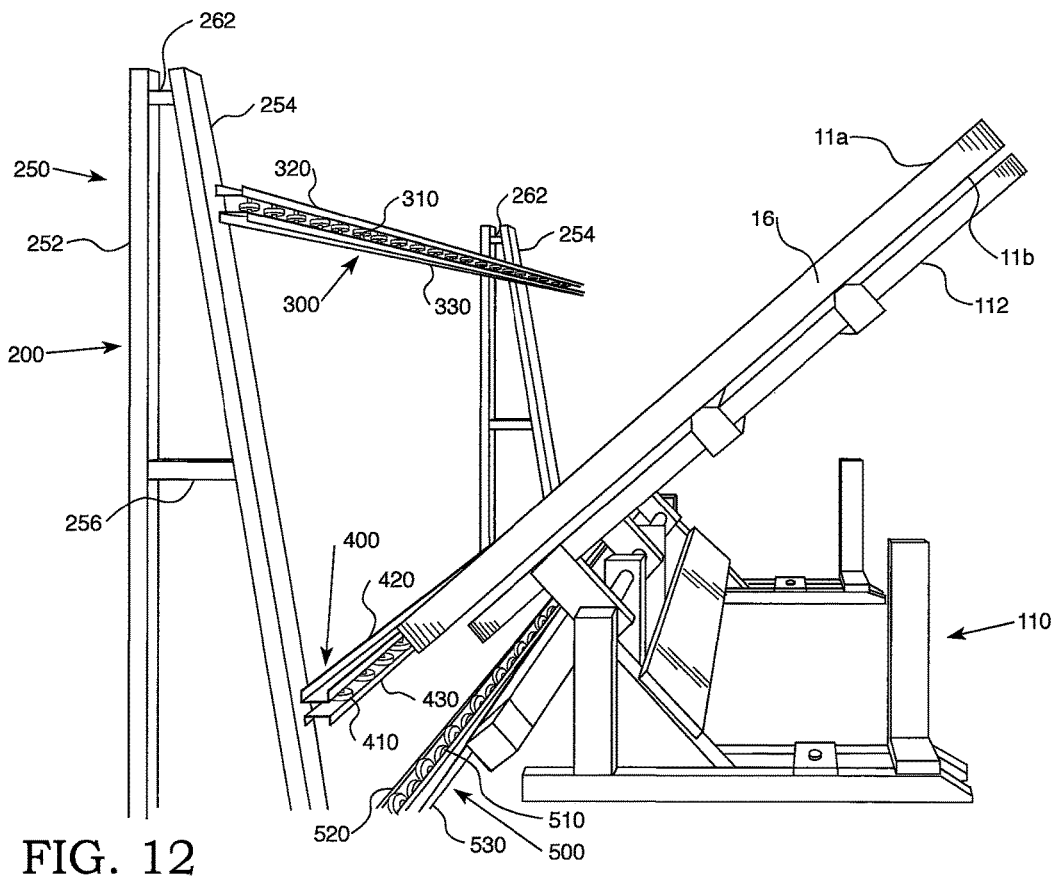
FIG. 12 is a side view of a frame having a foam panel attached thereto which is positioned on a tilting device as it is being tilted into a substantially upright position on a track conveyor.
Figure 13:
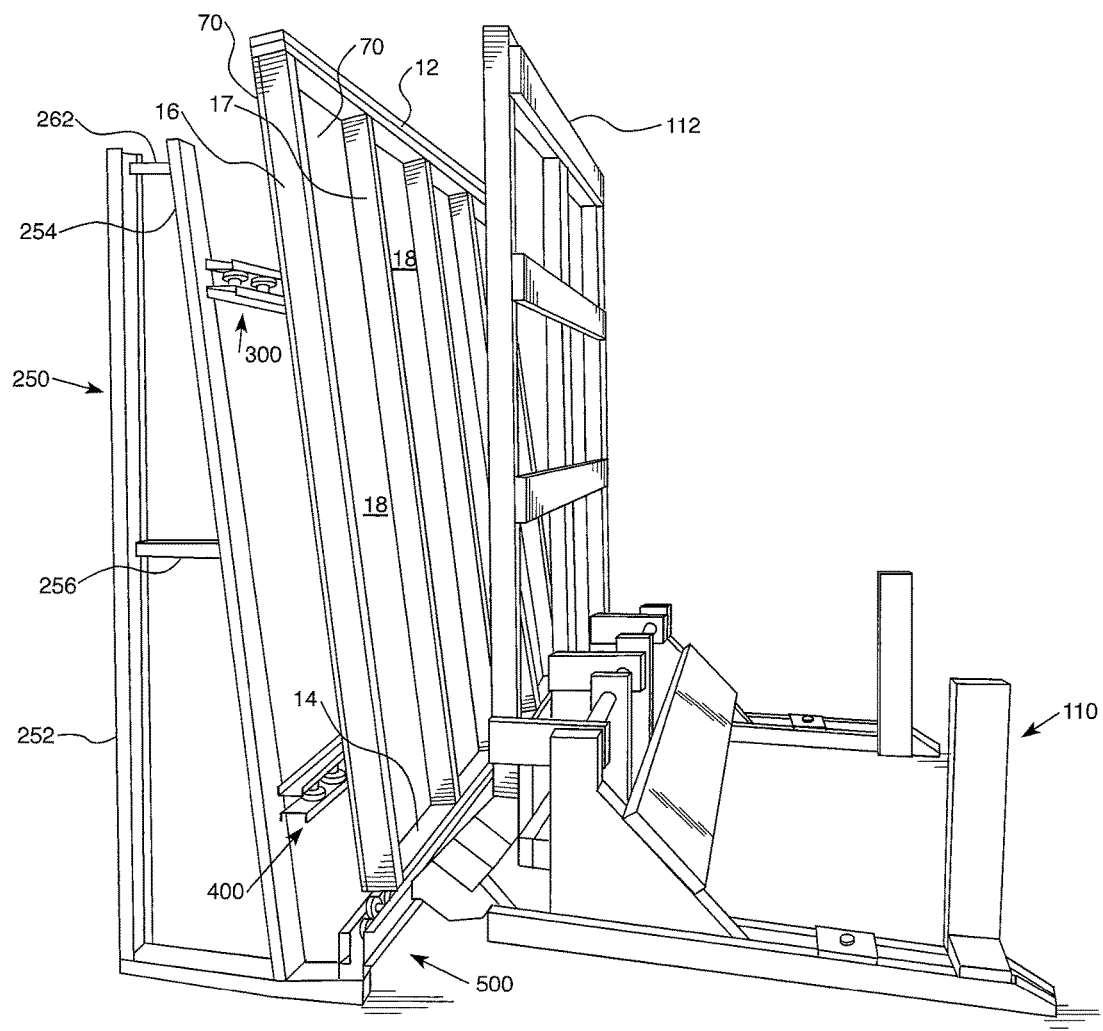
FIG. 13 is a perspective view of a frame having a foam panel attached thereto that is placed in a substantially upright position on a track conveyor after removal from a tilting device.

Referring now to FIGS. 12-13, The methods of this specification comprise placing the frame 11 having the foam panel 70 attached thereto on a track conveyor 200 that is configured to convey the frame 11 having the foam panel 70 attached thereto in a substantially upright position. As used herein, the term "track conveyor" refers to a device configured to convey frame 11 of a wall structure 10 in a substantially upright position and that includes at least one, in some cases more than one, track (or line) along which the frame 11 of a wall structure can travel and upon which the wall structure 10 can rest. The tracks included in the track conveyor utilized in the methods described in this specification can comprise any of a variety of devices to facilitate conveyance of a wall structure 10 along the track(s) in a substantially upright position, such as rollers, balls, bearings, wheels, and belts, among other devices. In some embodiments, however, the tracks of the track conveyor 200 comprise a plurality of rotating members, such as balls (sometimes referred to as ball bearing rollers) or wheels in which the track includes a plurality of such rotating members, i.e., circular objects that revolve on an axle and upon which the frame 11 lies while being conveyed, and which are disposed along the length of the track. As is depicted in FIGS. 12-13, for example, the frame 11 having the foam panel 70 attached thereto may be placed on a track conveyor 200 by tilting the frame 11 from a substantially horizontal position to a substantially upright position in which frame member 14 rests on a substantially vertically positioned track 500 of the conveyor 200. As is seen in FIGS. 12-13, this tilting of frame 11 can be accomplished by tilting device 110 in which tiltable platform 112 is repositioned from a substantially horizontal position to a substantially vertical position. Frame 11 is, in some embodiments, placed on conveyor 200 in a substantially upright position in which rear frame surface 11b faces away from substantially horizontally positioned track(s) 300, 400 of conveyor 200, so that it is completely exposed (i.e., there is no component or device between a spray foam applicator and the rear frame surface 11b, which allows for easy spray foam application over the entire wall structure, as described below), whereas front frame surface 11a faces towards, and may be in direct contact with, substantially horizontally positioned track(s) 300, 400, such as is depicted in FIG. 13.

The track conveyor 200 used in the methods of the present specification is configured to convey a frame 11 of a wall structure 10 in a substantially upright position. As used herein, "substantially upright position" when used with reference to the conveyance of a frame 11 of a wall structure means that the longest dimension of at least one of the frame members 12, 14, 16 and 17, in some cases frame member 16 and 17, is positioned generally perpendicular to the direction of gravity but not exactly perpendicular to the direction of gravity. For example, in some cases "substantially vertical" in this context means that the longest dimension of at least one of the frame members 12, 14, 16 and 17, in some cases frame members 16 and 17, is positioned at a slope of 75° to 88° from the direction of gravity, such as 78° to 88° from the direction of gravity, or, in some cases, 80° to 86° or 81° to 85° from the direction of gravity.

Figure 14A:
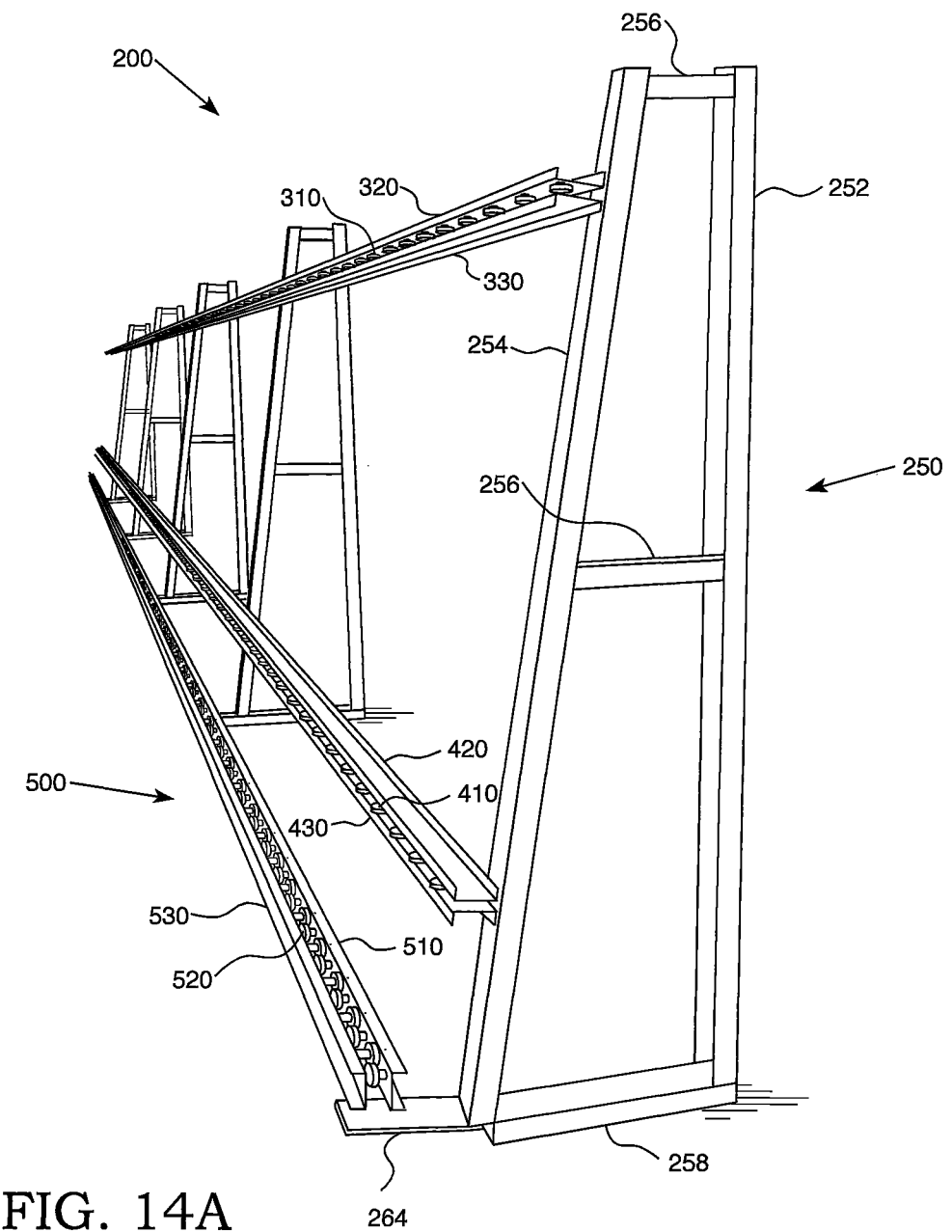
FIG. 14A is a perspective view of a track conveyor.
Figure 14B:
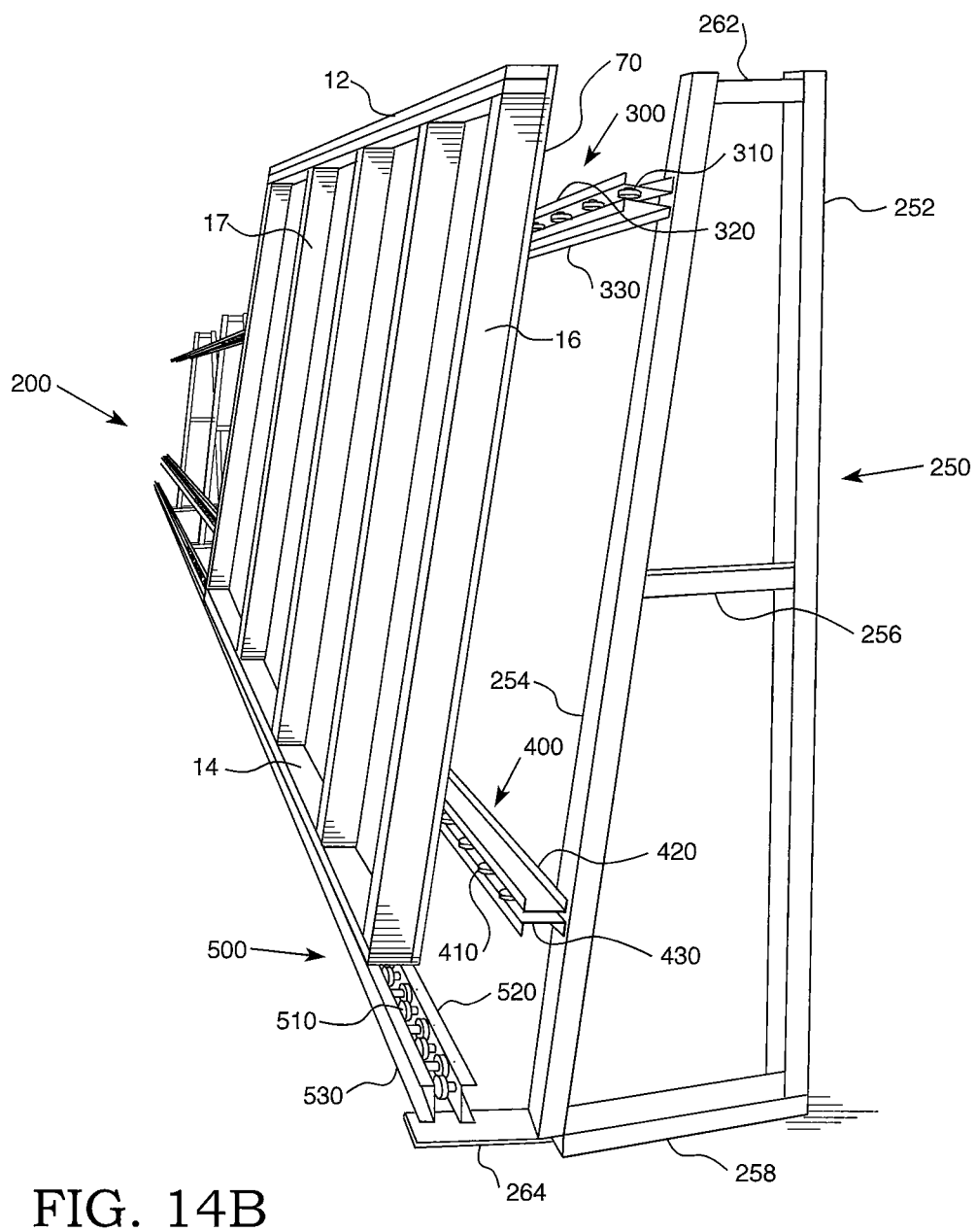
FIG. 14B is a perspective view of a frame having a foam panel attached thereto that is placed in a substantially upright position on a track conveyor and resting on a substantially vertically positioned track of the track conveyor.

Referring now in particular to FIGS. 14A and 14B, it can be seen that in some embodiments, the track conveyors 200 described in this specification comprise a plurality of spaced apart racks 250 between which a plurality of tracks are mounted and between which they extend. In some of these embodiments, the track conveyor 200 comprises three such tracks, 300, 400, 500.

Figure 15:
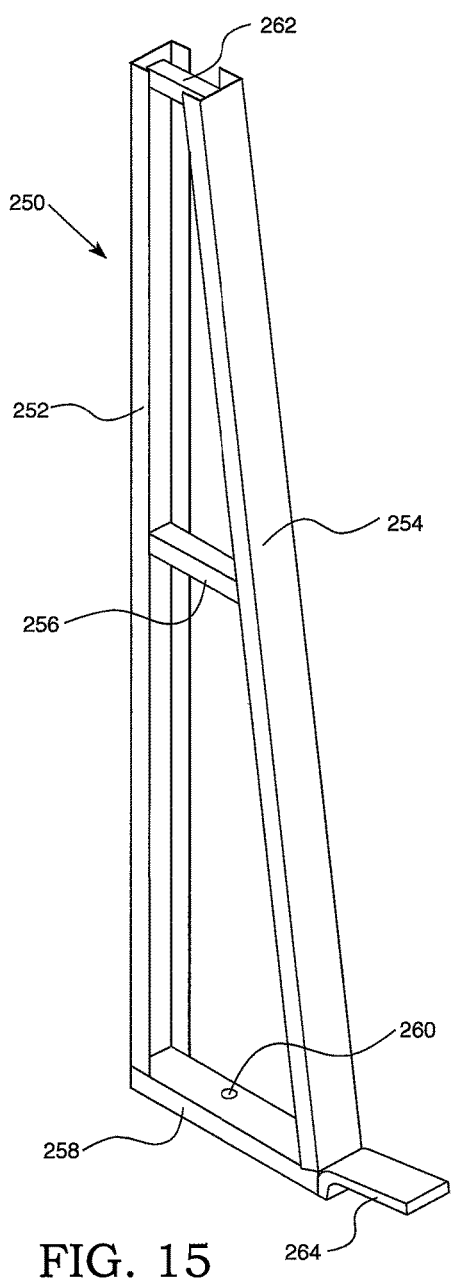
FIG. 15 is a perspective view of a rack of a track conveyor.
Figure 16:
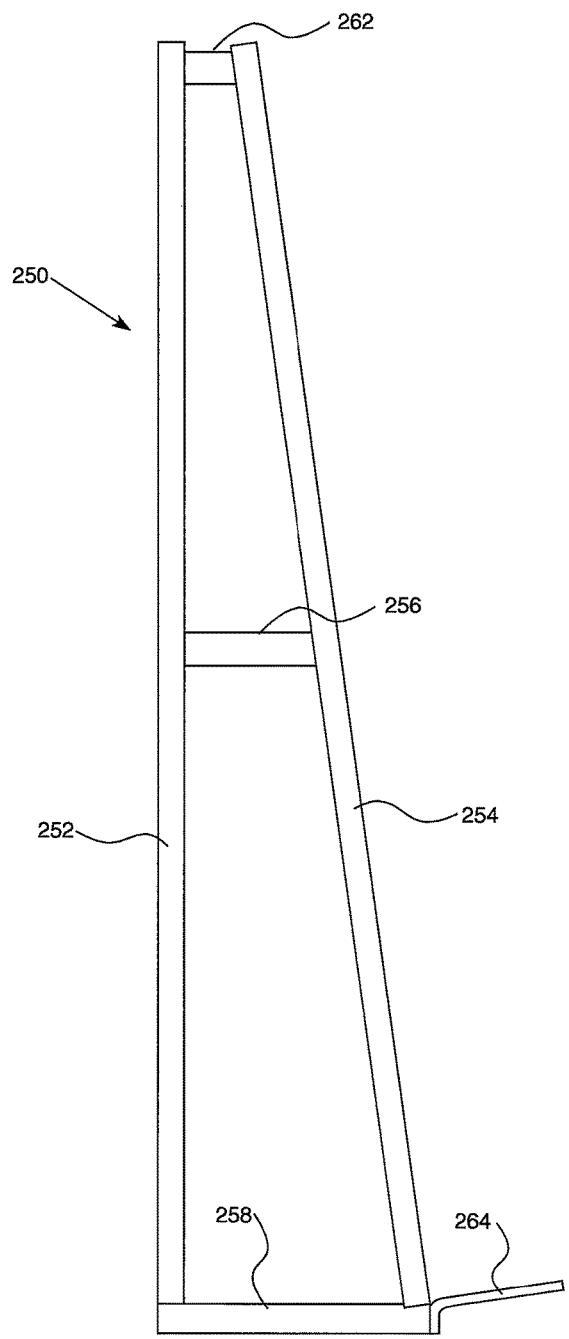
FIG. 16 is a side view of a rack of a track conveyor.

As is depicted in FIGS. 15-16, for example, some embodiments of the racks 250 described in this specification have a generally A-framed construction that include legs 252, 254 and an elevated cross-member 256 that is attached to legs 252, 254 and extends therebetween. These racks 250 may also include base member 258 extending between legs 252, 254 at one end thereof, in which the base member 258 includes an opening 260 configured to receive a fastener (not shown in FIGS. 15-16) that extends through opening 260 and into a floor to thereby secure the rack 250 to the floor of the manufacturing facility. The racks may also include a top cross-member 262 extending between legs 252, 254 at one end thereof, which is opposite from the end of legs 252, 254 between which base member 258 extends. As is also shown in FIGS. 15-16, racks 250 may include a rigid flap 264 extending outwardly from leg 254, such as from on end thereof, such as the end proximate to the location of base member 258, which is near the floor of the manufacturing facility. As used herein, the term "rigid" when used to describe flap 264, means that the flap is capable of receiving the frame 11 without bending, flexing, or moving.

The legs 252, 254 of rack 250 may be in a position parallel to one another. However, in some cases, such as is also illustrated in FIGS. 15-16, the legs 252, 254 are not exactly parallel to one another. For example, in the embodiment depicted in these Figures, leg 252 is shown positioned exactly perpendicular to, i.e. 90° from, the direction of gravity, whereas leg 254 is positioned 82° from the direction of gravity. As will be appreciated, however, these angles can be adjusted as desired.

Referring again to FIGS. 14A and 14B, for example, it is seen that the track conveyor 200 used in embodiments of the methods of this specification can include an upper substantially horizontally positioned track 300 mounted on the racks 250 and extending therebetween. As used herein, the terms "upper" and "lower," such as "upper substantially horizontally positioned wheeled track" and "lower substantially horizontally positioned wheeled track" refer to relative position, and are intended to facilitate explanation of the invention. These terms are not intended to limit the invention to any specific orientation of the horizontally positioned wheeled tracks unless otherwise indicated. In some embodiments, however, the upper substantially horizontally positioned wheeled track 300 is mounted on the racks 250 at a location above elevated cross-member 256 but below the end of legs 252, 254 between which top cross-member 262 may extend, as is shown in FIG. 14A, for example. The terms "above" and "below" or "beneath" refer to the relative position of two objects with each other relative to a floor or ground surface, i.e., an object "above" another objects means that the object is farther from the ground or floor surface than the other object, whereas an object "below" or "beneath" another object means that the object is closer to the ground or floor surface than the other object. As used herein, the term "substantially horizontally" when used with reference to the position of a track means that the track is positioned so that the rotating members that form part of the track, such as wheels, as depicted in FIGS. 14A and 14B, or balls, for example, are arranged such that the axis about which they rotate is generally perpendicular to the direction of gravity. For example, in some cases "substantially horizontally" in this context means that the track is positioned so that the rotating members are arranged such that the axis about which they rotate is at a slope of 80° to 90° from the direction of gravity, such as 85° to 90° from the direction of gravity, or, in some cases, 88° to 90° from the direction of gravity, in some cases 90° from the direction of gravity.

As is seen in FIGS. 14A and 14B, the upper substantially horizontally positioned track 300 can, in some cases, comprise a series of rotating members, such as balls or the depicted wheels 310, mounted on elongated members 320, 330. In some embodiments, as is shown in these figures for example, the series of rotating members, such as wheels 310, may comprise a single line of rotating members 310 in which each successive rotating member is disposed along the elongated members 320, 330 in a manner such that a single line of rotating members 310 is formed.

The track conveyor 200 used in embodiments of the methods of this specification can also include a lower substantially horizontally positioned track 400 mounted on the racks 250 and extending therebetween. In some embodiments, the lower substantially horizontally positioned track 400 is mounted on the racks 250 at a location below elevated cross-member 256 and above the end of legs 252, 254 between which base member 258 may extend and above a substantially vertically positioned track 500. As is seen in FIGS. 14A and 14B, the lower substantially horizontally positioned track 400 can, in some cases, comprise a series of rotating members, such as balls or the depicted wheels 410, mounted on elongated members 420, 430. In some embodiments, as is shown in these figures for example, the series of rotating members, such as wheels 410, may comprise a single line of rotating members, such as wheels 410, in which each successive rotating member is disposed along the elongated members 420, 430 in a manner such that a single line of rotating members, such as wheels 410, is formed, such as is described above with respect to some embodiments of the upper substantially horizontally positioned track 300.

As indicated, the track conveyor 200 used in embodiments of the methods of this specification can also include a substantially vertically positioned track 500 mounted on the racks 250 and extending therebetween. As used herein, the term "substantially vertically" when used with reference to the position of a track means that the track is positioned so that the rotating members that form part of the track, such as wheels, as depicted in FIGS. 14A and 14B, or balls, for example, are arranged such that the axis about which they rotate is generally parallel to the direction of gravity. For example, in some cases "substantially vertically" in this context means that the track is positioned so that the rotating members are arranged such that the axis about which they rotate is at a slope of 0° to 10° from the direction of gravity, such as 0° to 5° from the direction of gravity, or, in some cases, 0° to 2° from the direction of gravity, in some cases 0° from the direction of gravity.

As is illustrated in FIGS. 14A and 14B, the substantially vertically positioned track 500 can be disposed beneath the lower substantially horizontally positioned track 400. In some embodiments, as is shown in these figures for example, the series of rotating members, such as wheels 510, may comprise an alternating line of rotating members, such as wheels 510, in which each successive rotating member is disposed along the elongated members 520, 530 in a manner such that a two lines of rotating members, such as balls or wheels 410, are formed. In some cases, the substantially vertically positioned track can be mounted on rigid flap 264 at the end thereof that is most distant from leg 254. Such a configuration allows for wall structure 10 to rest on tracks 300, 400, 500 in a substantially upright position that, as described above, is not exactly perpendicular to, i.e. 90° from, the direction of gravity. Such as design provides a robust, versatile and safe wall structure conveyance system for conveying a wall structure in a substantially upright position, but without requiring that the wall structure be fastened to the conveyor. In addition, wall structures of varying height and containing foam panels of varying thicknesses can be easily accommodated.

If desired, the track conveyor 200 may be equipped with means to prevent the frame 11 from tipping off of the conveyor 200. Such means may include, without limitation, a safety rail, bar, cable or shepherd hook that, may be attached at the upper portion of the track conveyor 200 such that, should the frame 11 begin to tip off of the conveyor 200, the tip off prevention means would engage with at least a portion of the frame 11, such as frame member 12, thereby preventing the frame 11 from tipping over and falling off of track conveyor 200.

As a result, embodiments of this specification are also directed to such track conveyors that are configured to convey a wall structure in a substantially upright position. These track conveyers comprise: (a) a plurality of spaced apart racks; (b) an upper substantially horizontally positioned track comprising rotating members, such as wheels or balls, for example, mounted on the racks and extending therebetween; (c) a lower substantially horizontally positioned track comprising rotating members, such as wheels or balls, for example, mounted on the racks and extending therebetween; and (d) a substantially vertically positioned track mounted on the racks and extending therebetween, wherein the substantially vertically positioned track comprises rotating members, such as wheels or balls, for example, and is disposed beneath the lower substantially horizontally positioned track.

Figure 17:
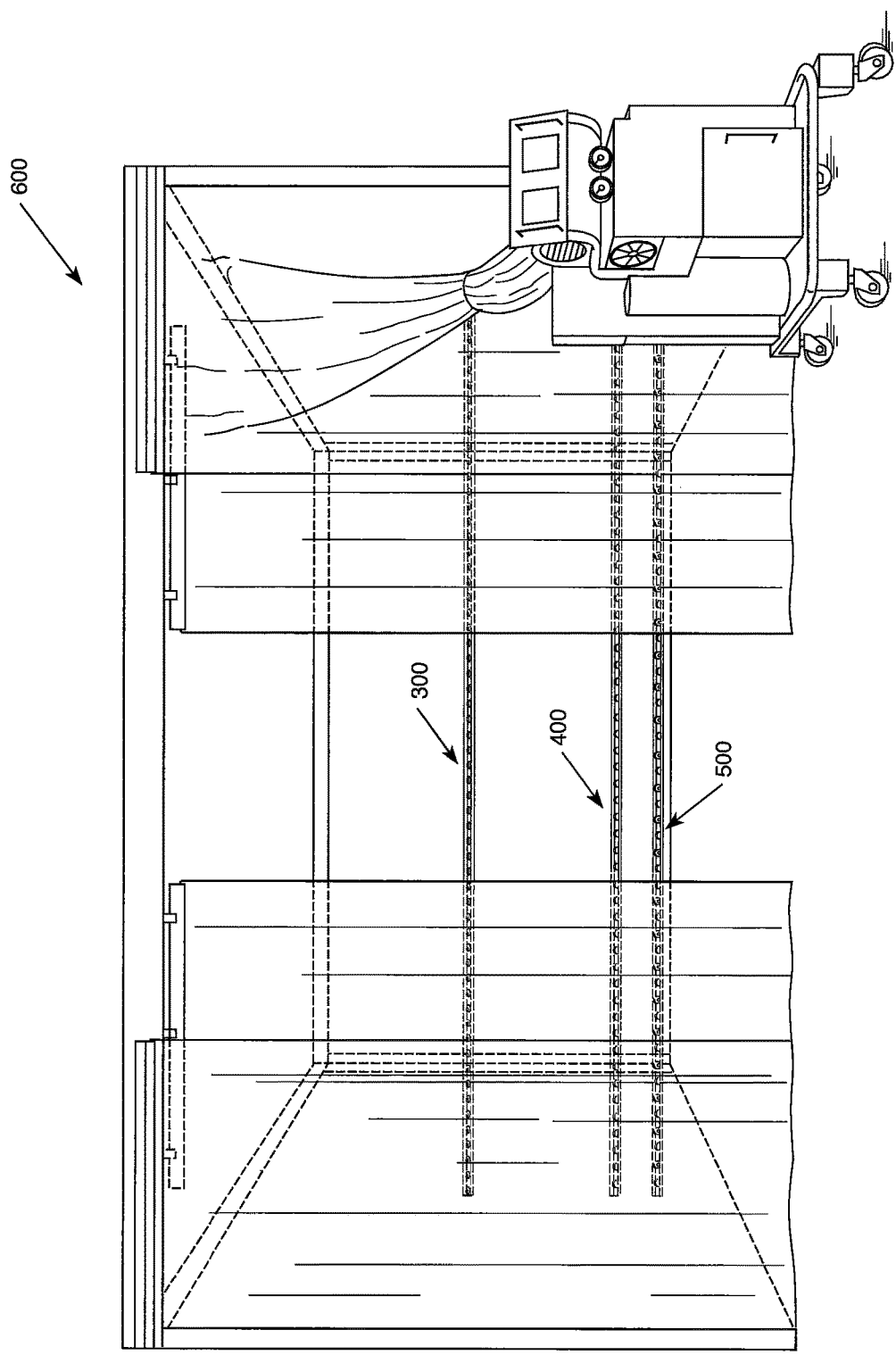
FIG. 17 is a front view of a spray foam application station.

The methods of the present invention comprise conveying the frame 11 having the foam panel 70 attached thereto on the track conveyer 200, in a substantially upright position to a spray foam application station 600, such as is depicted in FIG. 17. If desired, however, prior to conveying the frame 11 having the foam panel 70 attached thereto to the spray foam application station 600, particularly when secondary support members 20 and/or tertiary support members 22 are used with the wall structure 10 to form a secondary cavity 26, openings can be formed in the foam panel 70 by cutting out portions of the foam panel 70 that cover portions of the wall structure 10 that are to be free of foam, such as door and/or window frames. The foam panel 70 can be cut in such a manner while the frame 11 having the foam panel 70 attached thereto on the track conveyer 200 in a substantially upright position. To facilitate this, the track conveyer 200 can be configured so that at least a portion of the upper substantially horizontally positioned track 300 and/or the lower substantially horizontally positioned track 400 is retractable so that at least a portion of the track conveyer can be retracted away from the frame 11 during the cutting of foam panel 70 to form, for example, a door or window cut-out. For example, if desired, the track conveyer 200 can be designed so that at least a section of the upper substantially horizontally positioned track 300 and/or the lower substantially horizontally positioned track 400 is connected to a pneumatic cylinder (not shown in the Figures) such that, for example, when the pneumatic cylinder is in a retracted position, the track 300 and/or track 400 is moved away from the frame 11 having the foam panel 70 attached thereto on the track conveyor 200 so that the aforementioned cut-outs can be made without interference from the track 300 and/or track 400.

In the methods of this specification, at the spray application station 600 a spray foam composition is spray applied into the cavity 18 of the substantially upright positioned frame 11 having the foam panel 70 attached thereto to form a substantially upright positioned wall structure 10 having a foam layer 30 deposited in the cavity 18 in which the foam layer 30 adheres to the foam panel 70. The foam layer 30, which adheres to the foam panel 70 comprises a foam material deposited into the frame 11. Various spray application devices can be used to spray the foam composition into the cavity 18. One suitable device is a Fusion CS plural-component spray gun commercially available from Graco Inc. As will be appreciated, polyurethane foam is formed from combining a polyol component that typically comprises one or more polyols and other additives, such as blowing agents and flame retardants, among others, and a polyisocyanate component. In these cases, it is often desirable that the polyol component and polyisocyanate component be metered and mixed in a plural-component spray gun at a 1:1 volume ratio.

In some embodiments, the track conveyor 200 may be configured to adjust the position of the substantially upright positioned frame 11 having the foam panel 70 attached thereto in the spray application station 600 to allow for easy access to various portions of cavity 18 during the spray application process, such as by raising and lowering the position of the frame 11. This may be accomplished, for example, by connecting one or more of the tracks, such as, for example, substantially vertically positioned track 500, to a pneumatic cylinder (not shown in the Figures) such that, for example, when the pneumatic cylinder is in a retracted position, the frame is lowered for easier access to upper portions of cavity 18 and, when the pneumatic cylinder is extended, the frame 11 is raised to allow for easier access to lower portions of cavity 18.

Examples of foam materials that can be used as foam layer 30 include, but are not limited to, foams made with polyurethane, polyurea, polyisocyanurate (also referred to as polyiso), and mixtures thereof. Foam materials (including the foam layer 30) may be substantially free, may be essentially free, or may be completely free of halogen-containing flame retardant additives. The term "halogen" refers to the halogen elements, which include fluorine, chlorine, bromine, and iodine, and the term "halogen-containing flame retardant additives" refers to a substance that may be used to inhibit or resist the spread of fire, and which contains halogen groups such as a fluoro, chloro, bromo, and/or iodo groups. Further, the term "substantially free," as used in this specification, means the foam material contains less than 1000 parts per million (ppm), "essentially free" means less than 100 ppm, and "completely free" means less than 20 parts per billion (ppb) of halogen-containing flame retardant additives.

Referring to FIGS. 7, 8A, 8B, 9 and 18, in some embodiments the foam layer 30 is spray applied such that it has a thickness extending from a rear surface 70b of the foam panel 70 to a position intermediate the front frame surface 11a and the rear frame surface 11b. In this manner, a gap 40 may be formed within the frame 11 between a rear surface of the foam layer 30 and the rear frame surface 11b. Although in some cases the foam layer 30 has a thickness extending from the rear surface 70b of the first foam panel 70 to a position intermediate the front frame surface 11a and the rear frame surface 11b, it is understood that the foam layer 30 can alternatively comprise a thickness extending from the rear surface 70b of the first foam panel 70 to the rear frame surface 11b, in which case there may be no gap formed within the frame 11 between the rear surface 30b of the foam layer 30 and the rear frame surface 11b. In some embodiments, the gap 40 has a width, from the rear surface of the foam layer 30b to the rear frame surface 11b, of at least 1 inch (2.54 cm), such as 1 to 4.5 inches (2.54 to 11.43 cm), 1 to 2 inches (2.54 to 5.08 cm) or 1.5 to 2 inches (3.81 to 5.08 cm). In some embodiments, the foam layer 30 is deposited as a substantially continuous layer within the cavity 18, as shown in FIG. 18 for example, to provide optimal insulating properties. The gap 40 can be used as an area to incorporate home utility components 42 (see FIG. 4) such as electrical wires, cords, heating and cooling pipes, and plumbing fixtures. These home utility components may be inserted into the gap 40 located between the foam layer 30 and the rear frame surface 11b such that utilities components are not surrounded by or contacting the foam layer 30. In one example, the gap 40 comprises at least two inches as measured between the foam layer 30 and the rear frame surface 14.

Figure 9:
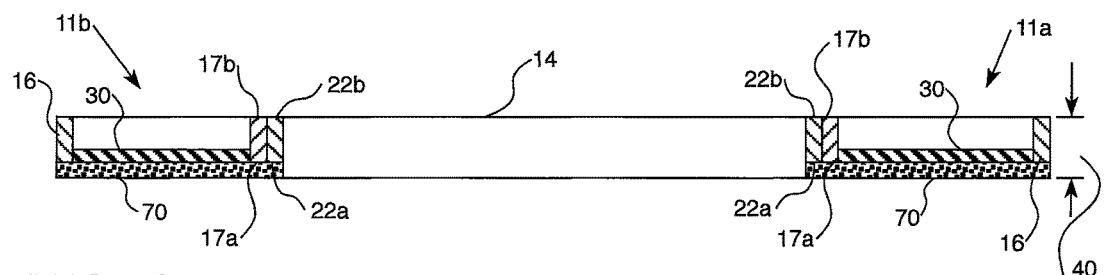
FIG. 9 is a top cross-sectional view of a wall structure of FIG. 5, at the vertical position where the window opening is located.

When secondary support members 20 and/or tertiary support members 22 are used with the wall structure 10 to form a secondary cavity 26, the secondary cavity 26 can be free of foam. For example, the foam layer 30 does not extend beyond and over the front secondary support surfaces 20a of the secondary members 20, the front tertiary support surfaces 22a of the tertiary support members 22, and/or beyond and over at least a portion of the front surfaces of other members that help form the secondary cavity 26. FIG. 9, for example, shows a top cross-sectional view with the foam layer 30 not extending beyond the front tertiary support surface 22a of the tertiary members 22. In such cases, corresponding openings may also be present in the foam panel 70. Such openings in the foam panel 70 can be formed by cutting out portions of the first foam panel 70 that cover portions of the wall structure that are to be free of foam, such as door and/or window frames, such as is described above.

The foam layer 30 is formed in-situ during the manufacturing process of the wall structure 10. The term "formed in-situ during the manufacturing process," as used in this specification, refers to the formation of a foam layer 30 as described in this specification during manufacturing of the wall structure 10 off-site at a facility remote or away from a building construction site. As such, the foam layer 30 may be formed not at a construction site as is required by conventional methods, but instead as a component of the pre-fabricated foamed wall structure 10.

The foam layer 30 is able to fill tight spaces and seal gaps that may not be visible to the naked eye. The foam layer 30 can also act as a vapor and thermal insulating barrier, which reduces energy consumption in buildings and residential homes when the wall structure 10 is used as a constituent wall panel. The foam layer 30 may provide structural stability to the wall structure 10, such as improved wall racking strength, which refers to the ability of a wall structure to maintain its shape under shear stress.

After the foam layer 30 has expanded and cured, the substantially upright positioned wall structure 10 can be conveyed out of the spray foam application station on the track conveyer 200. Thereafter, if desired, the foam layer 30 can be deflashed to remove excess foam material, such as any foam material that is deposited on the rear frame surface 11b. Deflashing can, in some embodiments, be done while the wall structure 10 is in a substantially upright position on the track conveyer 200. Various devices can be used for deflashing, such as a hoe or curry comb, among others.

Figure 18A:
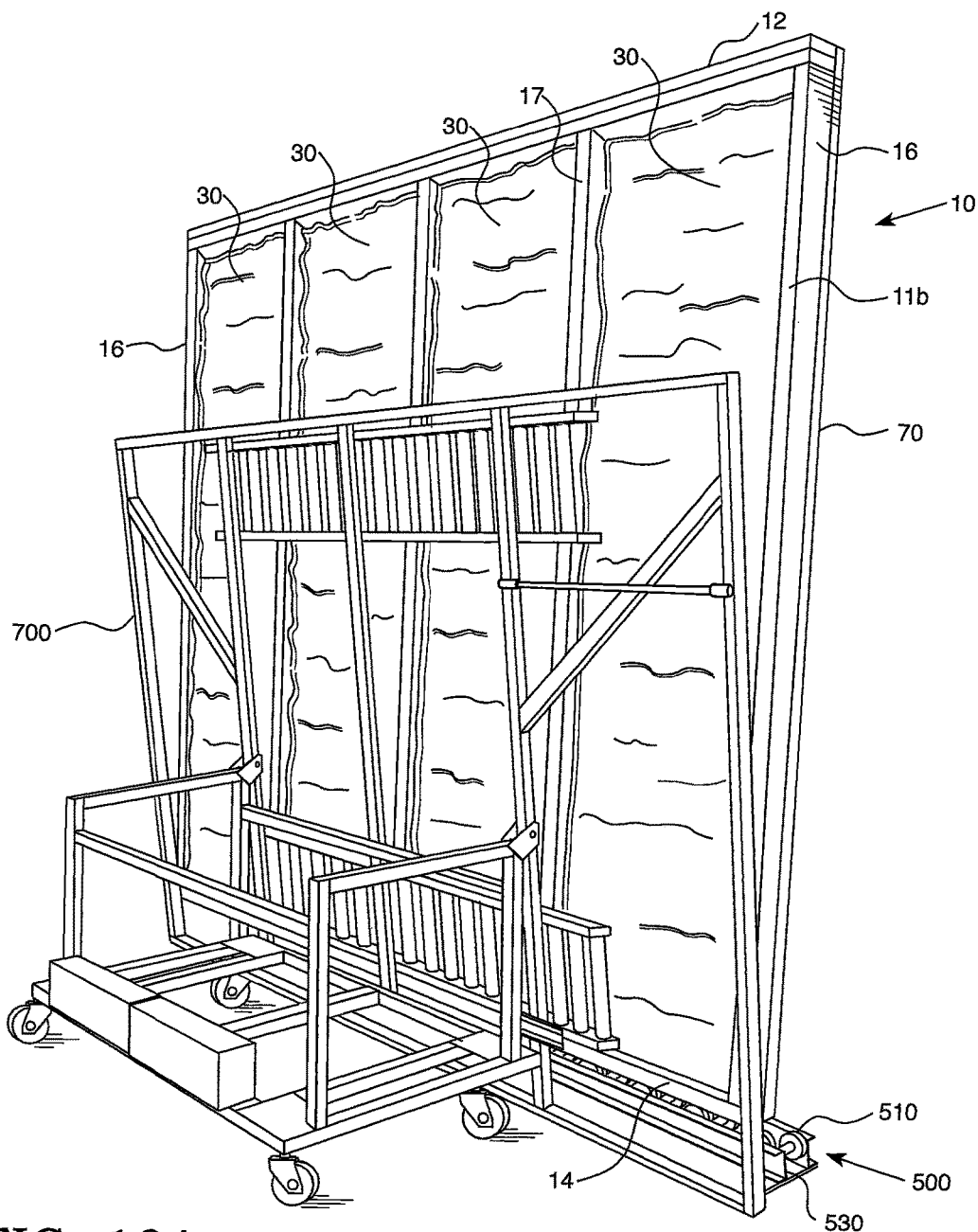
FIG. 18A is a perspective view of a pre-fabricated insulated wall structure that is placed in a substantially upright position on a track conveyor before tilting the wall structure onto a tip cart.
Figure 18B:
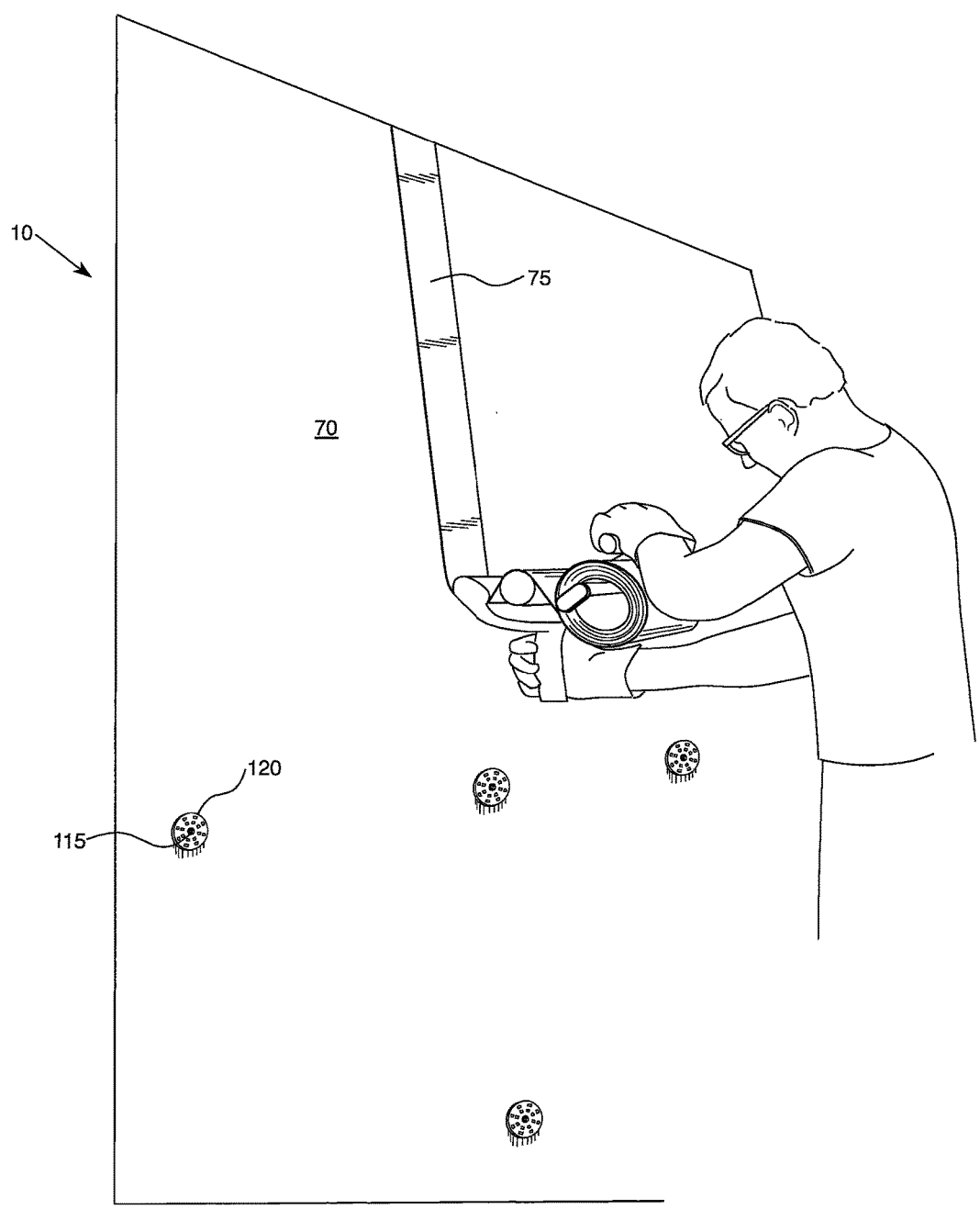
FIG. 18B is a perspective view of tape being applied over seams formed at adjacent sides of two foam panels of a pre-fabricated insulated wall structure while the wall structure is substantially upright positioned against a tip cart.
Figure 19A:
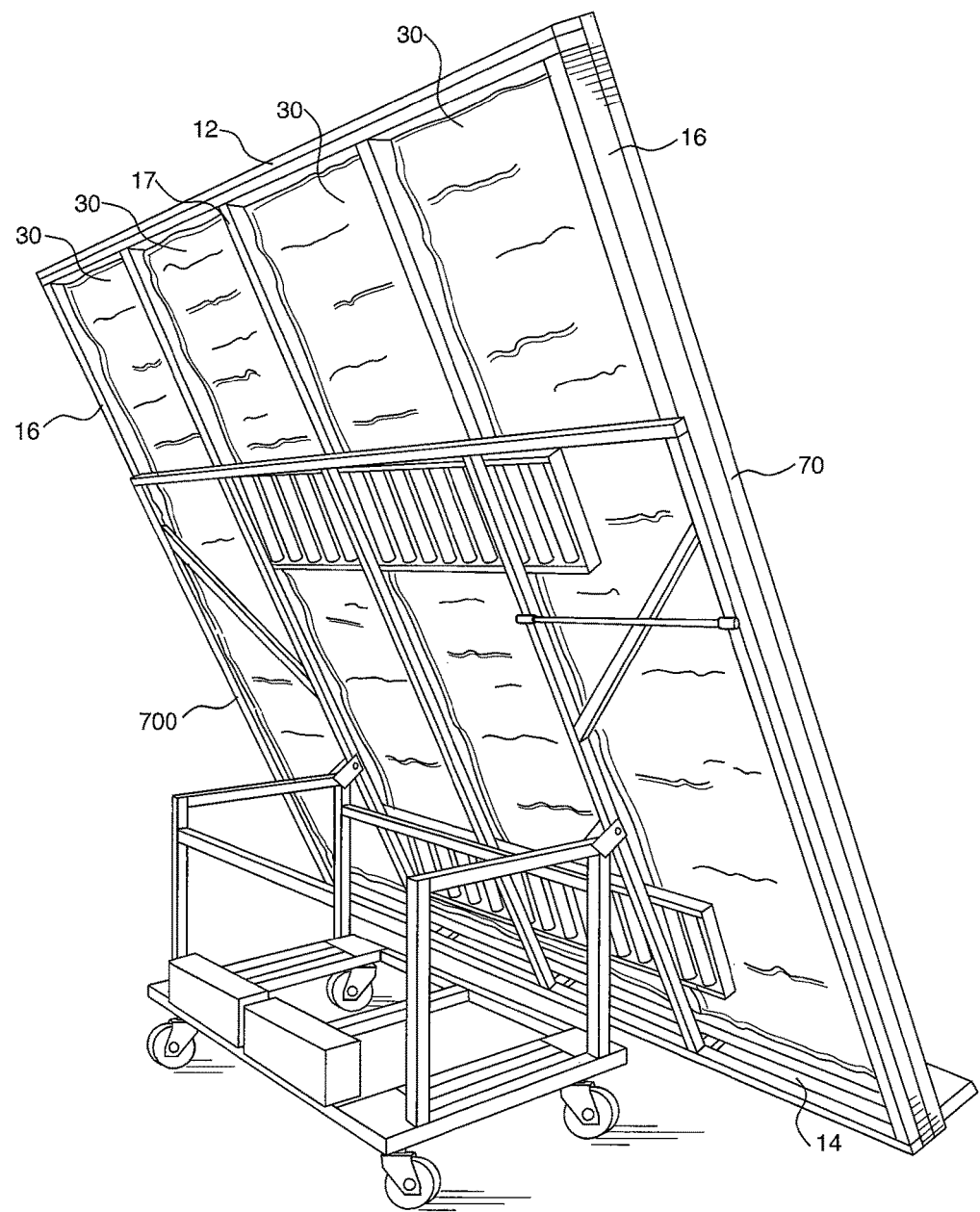
FIG. 19A is a perspective view of a pre-fabricated insulated wall structure being positioned substantially horizontally by repositioning a tip cart having the pre-fabricated insulated wall structure disposed thereon to a horizontal position.
Figure 19B:
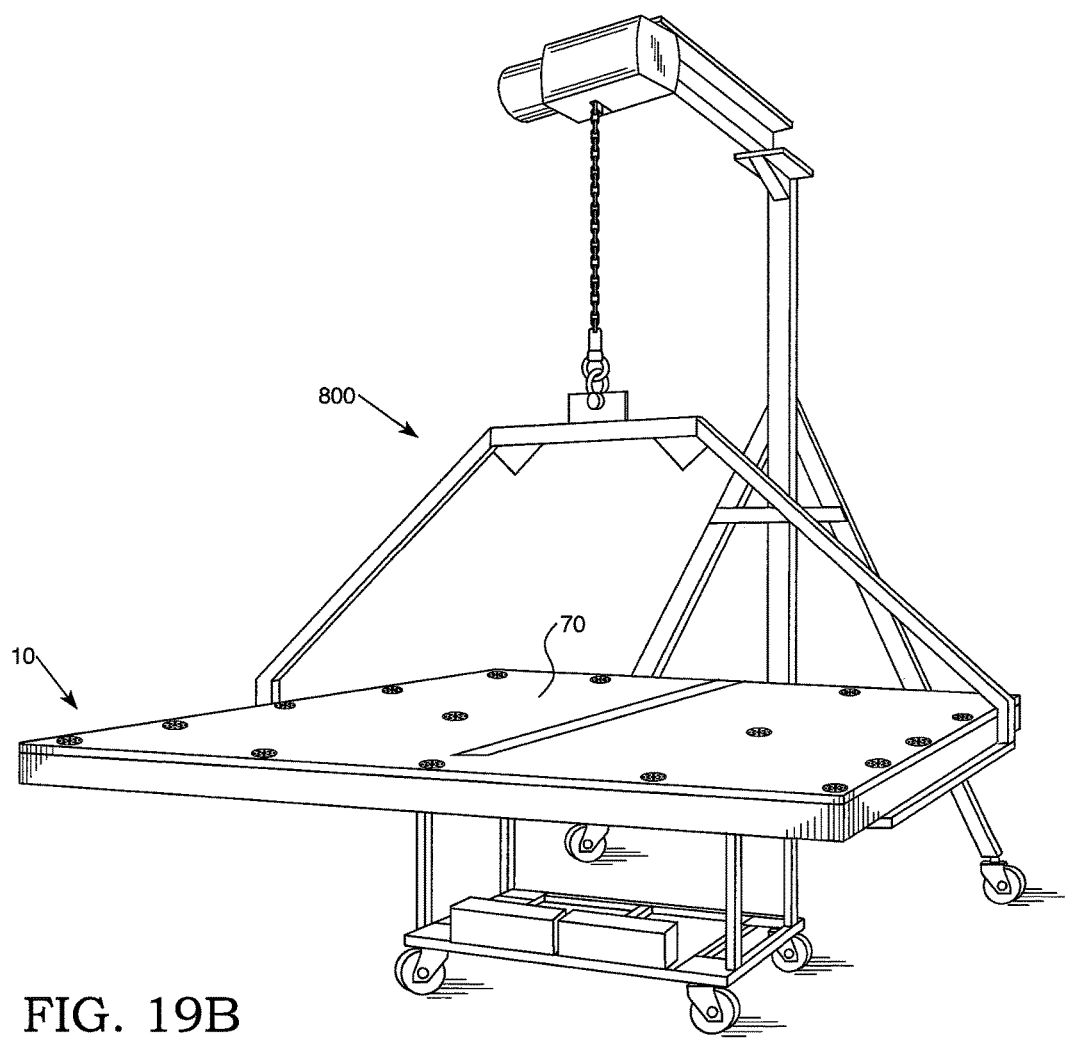
FIG. 19B is a perspective view of a substantially horizontally positioned pre-fabricated insulated wall structure engaged by a panel grabber prior to relocation of the wall structure for storage.

Referring now to FIGS. 18A and 18B, in cases where the wall structure 10 comprises two or more foam panels 70 adjacent with one another. A sealant, such as a tape 75 (or other sealant material, such as a liquid sealer) can be applied to front surfaces 70a of the foam panels 70 and over seams formed at adjacent sides of two foam panels 70 while the wall structure 10 is in a substantially upright position on the track conveyer 200. As is illustrated, in some of these embodiments, the front surfaces 70a of the foam panels 70 can be accessed by tilting the wall structure away from the substantially horizontally positioned tracks 300, 400 and against, for example, a support, such as tip cart 700. In these cases, the wall structure 10 can remain in a substantially upright position and can remain rested on track 500 of the track conveyer 200.

Finally, as shown in FIGS. 21A and 21B, the wall structure 10 can be positioned substantially horizontally by, for example, repositioning tip cart 700 to a horizontal position. As shown in FIG. 21B a panel grabber 800 can be used to move and stack finished wall structures 10 for storage.

The methods described in this specification can be used to produce pre-fabricated insulated wall structures that can be installed without any additional steps, thereby reducing the number of sub-contractors necessary to complete the installation of a wall at a construction site. In addition, the wall structure does not require additional materials such as exterior OSBs, and house wrap that are typically used in current residential building practices. Therefore, the wall structures described in this specification can decrease construction costs and/or decrease the overall cost per square foot per R-value.

The wall structures described in this specification also can impart a higher wall racking strength and improve thermal performance in comparison to existing wall solutions through the combination of the foam layer and the foam panels. Further, the wall structures described in this specification can help meet future R-value industry standards that are expected to increase in certain regions. With current fiberglass insulation, builders would have to convert 2×4-based wall designs to 2×6-based wall designs to ensure enough wall cavity capacity for additional insulation to meet such higher standards.

The wall structures described in this specification can also improve the consistency of installed insulation, and make it easy to install electrical and plumbing components, including components connected to exterior fixtures. The wall structures described in this specification can be used in new building construction or in retrofit or repair applications.

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. § § 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A method of making a pre-fabricated insulated wall structure comprising:
   (a) placing a frame having a front frame surface and a 1 to 2 inch thick foam panel attached to the front frame surface on a track conveyor configured to convey the frame in a substantially upright position in which the frame lies on rotating members of a substantially vertically positioned track and the foam panel lies on rotating members of a substantially horizontally positioned track, wherein
      (i) the frame comprises a first member, a second member spaced apart from the first member; and connecting members extending between the first member and the second member, wherein the first member, the second member, and the connecting members are 2×4 or 2×6 members,
      (ii) the first member, the second member, and the connecting members each comprise a front surface and a rear surface that form the front frame surface and a rear frame surface, and
      (iii) the foam panel, the first member, the second member, and the connecting members define a cavity within the frame;
   (b) conveying the frame having the foam panel attached thereto on the track conveyor in a substantially upright position to a spray foam application station; and
   (c) spray applying a spray foam composition into the cavity of the substantially upright positioned frame having the foam panel attached thereto in the spray foam application station to form a substantially upright positioned pre-fabricated insulated wall structure having a foam layer deposited in the cavity in which the foam layer adheres to the foam panel,
   wherein the track conveyor is configured so that, during the conveying, only the frame rests on the rotating members of the substantially vertically positioned track in cases where the foam panel covers the entire front frame surface.

2. The method of claim 1, further comprising cutting the foam panel attached to the substantially upright positioned frame on the track conveyor to form a window and/or door cutout.

3. The method of claim 1, wherein the foam panel is attached to the front faces of the first and second members, and to the front faces of the connecting members, with fasteners.

4. The method of claim 1, wherein the foam layer comprises a thickness extending from the rear surface of the foam panel to a position intermediate the front frame surface and the rear frame surface such that a gap is formed within the frame between a rear surface of the foam layer and the rear frame surface.

5. The method of claim 1, wherein the foam layer comprises polyurethane, polyurea, polyisocyanurate, or a mixture thereof.

6. The method of claim 1, wherein the longest dimension of at least one of the first member, the second member and the connecting members of the substantially upright positioned frame is at a slope of 78° to 88° from the direction of gravity.

7. The method of claim 1, wherein placing step (a) comprises repositioning a tiltable platform on which the frame having the foam panel attached thereto rests so as to tilt the frame from a substantially horizontal position to a substantially vertical position on the track conveyor.

8. The method of claim 1, wherein the rotating members of the substantially vertically positioned track are an alternating line of rotating members.

9. The method of claim 1, wherein the substantially vertically positioned track extends between a plurality of spaced apart racks of the track conveyor and is mounted on the spaced apart racks at an end of a rigid flap that is distant from a leg of rack such that a gap is formed in the horizontal dimension between an outermost edge of rotating members mounted on the substantially vertically positioned track and an innermost edge of rotating members of a substantially horizontally positioned track mounted on the rack.

10. The method of claim 1, wherein the foam panel comprises a polyiso panel, an expanded polystyrene panel, or an extruded polystyrene panel.

11. The wall structure of claim 10, wherein the foam panel comprises a polyiso panel comprising a polyisocyanurate foam layer and a facer material attached to a front face and a rear face of the polyisocyanurate foam layer.

12. The method of claim 1, further comprising conveying the substantially upright positioned wall structure out of the spray foam application station on the track conveyor.

13. The method of claim 12, further comprising deflashing the foam layer from the substantially upright positioned wall structure on the track conveyer.

14. The method of claim 12, further comprising positioning the pre-fabricated insulated wall structure substantially horizontally after step (c).

15. The method of claim 12, wherein the wall structure comprises two or more foam panels adjacent with one another and further comprising applying a sealant on front surfaces of the foam panels and over seams formed at adjacent sides of two foam panels while the wall structure is substantially upright positioned on the track conveyor.

16. The method of claim 15, wherein the front surface of the foam panel is accessed on the track conveyer by tilting the wall structure away from a substantially horizontally positioned track on the track conveyor and against a support.

17. The method of claim 1, wherein the track conveyor comprises:
   (1) a plurality of spaced apart racks;
   (2) an upper substantially horizontally positioned track mounted on the racks and extending therebetween and comprising rotating members disposed along the length of the track;
   (3) a lower substantially horizontally positioned wheeled track mounted on the racks and extending therebetween and comprising rotating members disposed along the length of the track; and (4) a substantially vertically positioned wheeled track mounted on the racks and extending therebetween and comprising rotating members disposed along the length of the track, wherein the substantially vertically positioned wheeled track is disposed beneath the lower substantially horizontally positioned wheeled track.

18. The method of claim 17, wherein the racks have an A-framed construction comprising legs and an elevated cross-member extending between the legs and attached thereto.

19. The method of claim 18, wherein the racks comprise a base member extending between the legs at one end thereof and which comprises an opening configured to receive a fastener that extends through the opening and into a floor.

20. The method of claim 18, wherein the racks comprise a rigid flap extending outwardly from a leg and upon which the frame having the foam panel attached thereto rests while on the track conveyor.

21. The method of claim 18, wherein the upper substantially horizontally positioned track is mounted on the racks at a location above the elevate cross-member and the lower substantially horizontally positioned track is mounted on the racks at a location below the elevated cross-member.

22. A method of making a pre-fabricated insulated wall structure comprising:
  (a) attaching a 1 to 2 inch thick foam panel to a front frame surface of a substantially horizontally positioned frame, wherein
    (i) the frame comprises a first member, a second member spaced apart from the first member; and connecting members extending between the first member and the second member, wherein the first member, the second member, and the connecting members are 2×4 or 2×6 members,
    (ii) the first member, the second member, and the connecting members each comprise a front surface and a rear surface that form the front frame surface and a rear frame surface, and
    (iii) the foam panel, the first members, the second member, and the connecting members define a cavity within the frame;
  (b) placing the frame having the foam panel attached thereto on a track conveyor configured to convey the frame in a substantially upright position in which the frame lies on rotating members of a substantially vertically positioned track and the foam panel lies on rotating members of a substantially horizontally positioned track;
  (c) conveying the frame having the foam panel attached thereto on the track conveyor in a substantially upright position to a spray foam application station; and
  (d) spray applying a spray foam composition into the cavity of the substantially upright positioned frame having the foam panel attached thereto in the spray foam application station to form a substantially upright positioned pre-fabricated insulated wall structure having a foam layer deposited in the cavity in which the foam layer adheres to the foam panel,
  wherein the track conveyor is configured so that, during the conveying, only the frame rests on the rotating members of the substantially vertically positioned track in cases where the foam panel covers the entire front frame surface.

23. The method of claim 22, wherein the placing step (b) comprises repositioning a tiltable platform on which the frame having the foam panel attached thereto rests so as to tilt the frame from a substantially horizontal position to a substantially vertical position on the track conveyor.

24. The method of claim 22, wherein the rotating members of the substantially vertically positioned track are an alternating line of rotating members.

25. The method of claim 22, wherein the substantially vertically positioned track extends between a plurality of spaced apart racks of the track conveyor and is mounted on the spaced apart racks at an end of a rigid flap that is distant from a leg of rack such that a gap is formed in the horizontal dimension between an outermost edge of rotating members mounted on the substantially vertically positioned track and an innermost edge of rotating members of a substantially horizontally positioned track mounted on the rack.

* * * * *